US009563868B2

(12) United States Patent
Norberg

(10) Patent No.: US 9,563,868 B2
(45) Date of Patent: Feb. 7, 2017

(54) ARRANGEMENT FOR MINIMIZING COMMUNICATION AND INTEGRATION COMPLEXITY BETWEEN SOFTWARE APPLICATIONS

(75) Inventor: Thomas Norberg, Enskededalen (SE)

(73) Assignee: TARIFFLEX AB, Stockholm (SE)

( * ) Notice: Subject to any disclaimer, the term of this patent is extended or adjusted under 35 U.S.C. 154(b) by 806 days.

(21) Appl. No.: 14/007,287

(22) PCT Filed: Mar. 23, 2012

(86) PCT No.: PCT/SE2012/050324
§ 371 (c)(1),
(2), (4) Date: Nov. 25, 2013

(87) PCT Pub. No.: WO2012/134375
PCT Pub. Date: Oct. 4, 2012

(65) Prior Publication Data
US 2014/0074750 A1     Mar. 13, 2014

(30) Foreign Application Priority Data
Mar. 25, 2011   (SE) ...................................... 1150269

(51) Int. Cl.
*G06F 3/00*     (2006.01)
*G06F 9/44*     (2006.01)
(Continued)

(52) U.S. Cl.
CPC ............. *G06Q 10/067* (2013.01); *G06F 13/42* (2013.01)

(58) Field of Classification Search
None
See application file for complete search history.

(56) References Cited

U.S. PATENT DOCUMENTS 6,742,073 B1 *   5/2004   Poisner ............... G06F 13/4004
                                                710/305
6,904,480 B1 *   6/2005   Hobbs .................... G06F 13/42
                                                710/100
(Continued)

FOREIGN PATENT DOCUMENTS

CN         101286953 A      10/2008
WO         WO 99/56206 A1   11/1999
WO         WO 02/065360 A2   8/2002

OTHER PUBLICATIONS

Nielsen et al., "A Methodology for Managing Model Extensions when Using the Common Information Model for Systems Integration", Power&Energy Society General Meeting, 2009. PES '09. IEEE, Jul. 26, 2009, pp. 1-5.
(Continued)

*Primary Examiner* — Craig Dorais
(74) *Attorney, Agent, or Firm* — Birch, Stewart, Kolasch & Birch, LLP

(57) ABSTRACT

A computer system arrangement for minimizing communication and integration complexity between a plurality of software applications having each an individual data model defining an individual set of application parameters, includes a bus arrangement having connections to each one of said plurality of applications, the bus being arranged to interpret between each application and to orchestrate incoming and outgoing requests from each application, the bus arrangement including, a generic information model defining a set of generic parameters in relation to the application parameters of each application, an adaptor together with said generic information model, in connection with an incoming request, arranged to map parameters of that individual data model to said generic parameters, a device arranged to transfer the mapped generic information model together with the request to a process execution engine, which
(Continued)

includes a device arranged to handle the request to identify a corresponding adaptor to which the request was directed, and using the corresponding adaptor together with the generic information model to remap the request to the individual data model of the application to which it is was directed.

20 Claims, 20 Drawing Sheets

(51) Int. Cl.
  *G06F 9/46* (2006.01)
  *G06F 13/00* (2006.01)
  *G06Q 10/06* (2012.01)
  *G06F 13/42* (2006.01)

(56) References Cited

U.S. PATENT DOCUMENTS

| | | |
|---|---|---|
| 2003/0120502 A1 | 6/2003 | Robb et al. |
| 2003/0179772 A1 | 9/2003 | Niklasson |
| 2007/0208768 A1 | 9/2007 | Laik et al. |
| 2008/0049920 A1 | 2/2008 | Napoleoni et al. |

OTHER PUBLICATIONS

Svensson et al., "Data Consistency in a Heterogeneous IT Landscape: A Service Oriented Architecture Approach", Enterprise Distributed Object Computing Conference, 2004. EDOC 2004. Proceedings. Eighth IEEE International Monterey, CA, USA Sep. 20-24, 2004.

\* cited by examiner

ARRANGEMENT FOR MINIMIZING COMMUNICATION AND INTEGRATION COMPLEXITY BETWEEN SOFTWARE APPLICATIONS

The present invention relates to a computer system arrangement according to the pre-characterizing portion of claim 1 and a method to execute the same according to the preamble of claim 11.

STATE OF THE ART

Operators of telecommunication networks, utilities, and other types of services interact with their customers through telephone, web, letters, etc. The customers pay for the services based on their usage, tariff, agreement type, etc. This invention has its origin and is described in the context of a telecommunications operator. However it should be applicable also in other industries with similar need for interactions between different support systems. It may also be particularly useful in combining IT systems from different industries.

Essentially all telecommunication operators use IT systems to support their key processes. There is a large number of systems for billing, service activation (provisioning), customer interaction, technical support, etc. that operators use to handle these functions with a minimum of manual interaction.

The systems may be operated by the operator in-house, or outsourced to a third party.

Customers expect many ways to interact with the operator (phone, fax, email, mail, web self service, IVR, etc.). At the same time, the technical development and competitive pressure on the operators have made them produce many kinds of tariff structures for a variety of products and product bundles. This has led to increasing complexity for an operator to administrate the subscriptions, interaction with customers, accounting, activation/deactivation of services, troubleshooting, etc.

It is difficult to use a single all-in-one "standard" system to handle all of these interactions because all operators are different, has different network equipment, has different legislation, languages, and has local practices. Therefore, the support systems are often built using subsystems/applications, each focused on a particular task like billing, customer care, provisioning, accounting, etc and adapted to the business environment of the operators.

Manual interaction need to be minimized due to the large volume of transactions that need to be processed. Even more importantly, manual handling is very difficult due to the large number of pricing and product packaging combinations that are common.

Many operators prefer to outsource certain activities (e.g. billing, customer service, etc.) making it even more likely that different systems (with its own information models) are used by each outsourcing partner. This has lead to an ever-increasing complexity (and cost) for operators to keep all support systems synchronized. Different service partners or systems are needed to perform each task efficiently, but at the same time the systems need to interact with each other in order to update data, to retrieve information, and perform various functions.

As the operators networks are made more complex to support more functions, additional support systems are required that need to interact with many of the legacy systems.

The result is that the operators are struggling with integrating the different business support system functions with each other, often with one system depending on many others. It also often depends on data and configurations being made in different systems rather than in a single location.

FIG. 1 illustrates a known computer arrangement system in which the problem is that many systems are integrated and which gives an example where product prices are entered into several systems which is quite common in these kinds of architectures.

Each integration takes time and costs money to implement, test, maintain and update. Therefore, the costs and time of the integration, as well as possible sources of error increase rapidly with the number of systems.

In summary, the architecture of the system in FIG. 1 has the following disadvantages:
  Large amount of integration and configuration to get the system operational
  Due to the many interactions with many other systems, it is very difficult to replace one system if its supplier stops supporting it or it becomes unreliable or insufficient for some other reason
  Difficult, slow, and costly to make any changes in the customer offering.
  The complexity increases rapidly with the number of systems ($n^2$), making it difficult to scale to large number of systems or to accommodate several operators needs in one system.
  Each system that integrates with another system needs to know the communication ability as well as the information definition and structure of that system.

Several known methods to mitigate some of the problems outlined above have been considered and to various degrees implemented, including:
  1. Standards exist for how to describe information when exchanging information between support systems. It is known that adherence to a common information model can simplify exchange of data between subsystems. It is typically referred to as a shared, common, or canonical data model.
  2. Various concepts for Information Bus/Enterprise Application Integration/Integration bus/Integration hub/Information Hub (many names for the same or similar concepts) exist. These function by acting as a connecting hub and thus facilitating interconnection and exchange of information between different support systems.
  An example is shown in FIG. 2 (WO 02/065360).
  In this example, an Enterprise Application Integration bus serves the function to interconnect the different subsystems, including making a data mapping from the data formats in one system to that in the other.

The two methods listed above have some merit, but have the following shortcomings:
  The standardized/shared/canonical information model only works well when all subsystems adhere to them. In reality, that is rarely (possibly never) the case. It is also a problem when it is extended and e.g. new information is added since these additions can not be made in all systems simultaneously. It could also be that new features, requiring exchange of data not yet in the standard information model, requires proprietary modifications. This means that to stay in the frontline of functional development, it is difficult to follow a standard and the implementation is in fact bound to diverge from the standard information model. Such divergence from the standard is difficult to maintain in all affected subsystems simultaneously.

The Information bus concept as typically implemented and as described in the example, only concentrates the problem of integration to the data mapping in the bus. The basic problem with many-many relationship remains, just that each translation (or at least a part of it) takes place in the data mapping in the bus. Therefore the basic problem that each system is dependent on integration with many others is not mitigated.

Even if integrated, the different subsystems often use different names and concepts making it hard to follow and relate to the meaning of, say, an "account" when staff are working with the different systems and talk to each other. An "account" in one system made to serve the billing department/function may roughly be referred to as a "customer" in another system made to serve the customer support department/function, while the concept in the sales department might be "subscription". Furthermore, there may not be a 1:1 mapping between these. One customer may have several accounts, each with several subscriptions which in turn uses several "terminals" activated with different "functions". Even if vaguely related, it is hard to intuitively understand how the concepts relate to each other since the translations and mapping is made between each pair of subsystems.

From US2007/0208768 there is known a system for modeling of activity data. In this known system the process is based on subordinating information in relation to activities. The data model uses a plurality of activity classes, wherein each activity class includes a set of data elements that is common to various activity types. The activity class defines relationships of an activity with various entities related to the activity. For each activity class there is a separate data model for mapping off information. As a consequence a plurality of different mapping models must be handled and structured by means of the system, which leads to an undesired complexity. Furthermore the preferred embodiment described in the application implies a kind of point to point interaction by means of the central data handling device, being in the form of a server rather than a bus.

BRIEF DESCRIPTION OF THE INVENTION

One object of the invention is to provide a computer system arrangement (hereinafter also referred to as "CSA") which should be broadly construed) which is more effective and sets aside or at least minimizes, the disadvantages mentioned about concerning known systems. Another object of the invention is to provide method to execute said computer system arrangement.

These objects are achieved by means of a computer system arrangement as defined in the characterizing portion of claim 1 and a method as defined in the characterizing portion of claim 11, which provides significant advantages.

The dependent claims define preferred embodiments of the invention.

A computer system arrangement according to the invention introduces a method to integrate subsystems in an efficient way, handling product definitions and prices and also relates the information model used in the IT system to concepts used in the organization in an intuitive way. All this is performed without placing significant new requirements on already existing subsystems which makes the computer system arrangement according to the invention useful both as an improvement of existing and new business support system installations combining different subsystems on the market.

To construct the system described above, one would make the necessary data mapping/conversion/translation/formatting/protocol adaptations between each subsystem and the information bus. A description is also made to describe and get an overview of the relation between the model used by the organization (organizational information model) and the information model in the bus (Technical information model).

These two mapping/integration activities (between each subsystem and the information model in the bus) and (between the information models in the organization and the information model in the bus) are thus the central part in the entire solution. To make sure it is documented and maintained in a good way in larger systems, it is recommended to use a tool for structured graphical programming both for the initial design and to make changes through this tool.

Additional programming and hardware may be required depending on the nature of each subsystem to ensure a well functioning integration, for instance to match physical and logical interfaces.

In order to benefit from this solution fully, it is important to include at least one product configurator and database, which includes definitions of all products that the company offers. This may be a stand-alone system or possibly a part of some other sub-system. However, due to its central nature, a stand-alone system is recommended separated from e.g. CRM and CSA systems. The product configuration is then handled using a product configurator application. The product database acts as a master database for all products and contains product information, relations and configurations from the customer target and sales channel level all the way down to the technical services that are implemented in the network. It contains all technical information as well as price information. It also has all business as well as technical rules related to each and every product and offering. An illustration of the typical structure of a product definition is illustrated in FIG. 7, which also shows how different parts of the organization and the IT systems relate to the product definitions.

Finally, the subsystems used to illustrate the invention are just examples. There could be more or fewer subsystems and they might be divided in different ways. There may for instance be a combined CRM, CSA system, and product configurator. Or, there may be several systems involved in the same functions. One CSA may be used for a subsidiary in one country and another for another country Specifically, when comparing the invention with known technology two representative patent applications illustrate what is described as known technology. Known systems as US 2003/120502 and US 2008/049920 include various use of an integration bus. These systems differs from the CSA according to the invention in that they do not use the concept of a data model that is independent of each data model in the subsystems. Rather it refers to a shared (or canonical) data model. They therefore do not include the concept of double translations to and from an intermediary (independent) data model. Furthermore, they lack the simple way to make the mapping to the information model used in the organization and does not describe any way how to practically implement the solution to obtain the advantages of this invention. In fact, known implementations of concepts similar to these do indeed suffer from massive practical problems.

Summary of advantages that may be achieved (one of them, some of them or all of them) in accordance with a preferred embodiment of the invention, compared to previous solutions Cheaper to build because fewer integrations between subsystems are required when the number of subsystems that need integration exceed 3.

Faster to change—much easier to replace systems or to introduce new services

Smaller risk of mistakes and simpler troubleshooting/fault isolation

Less costly to maintain because of fewer interfaces

The linear scalability in integration complexity makes it possible to handle a very large number of subsystems which is of particular benefit to the following businesses Complex operators (such a large variety of customer types, products, networks, product packages, service providers, technologies, countries, etc.)

Operators present in several countries with a mix of centralized and local IT support systems.

An IT outsourcing business offering outsourced IT services to several operators that sometimes have similar applications, sometimes different.

It is possible for anyone to overview how the concepts they use in their daily work are reflected in the IT support system.

The only critical part that is difficult to replace is the integrations themselves, meaning that as long as the operator can control these, it is fairly simple to e.g. replace an aging subsystem with a more modern one, or to replace one outsourcing partner with another. This is because replacement of one such system only requires a new integration to the information bus and does not affect the integrations to the other systems. In the event the bus itself needs replacement, the number of integrations to introduce a new bus is still far below the complexity of making substantial changes in conventional systems due to the lower number of integrations.

BRIEF DESCRIPTION OF THE DRAWINGS

Preferred embodiments of a computer system arrangement, CSA, according to the invention will be described more in detail below with reference to the accompanying drawings wherein.

DESCRIPTION OF PREFERRED EMBODIMENTS

Figure 1:
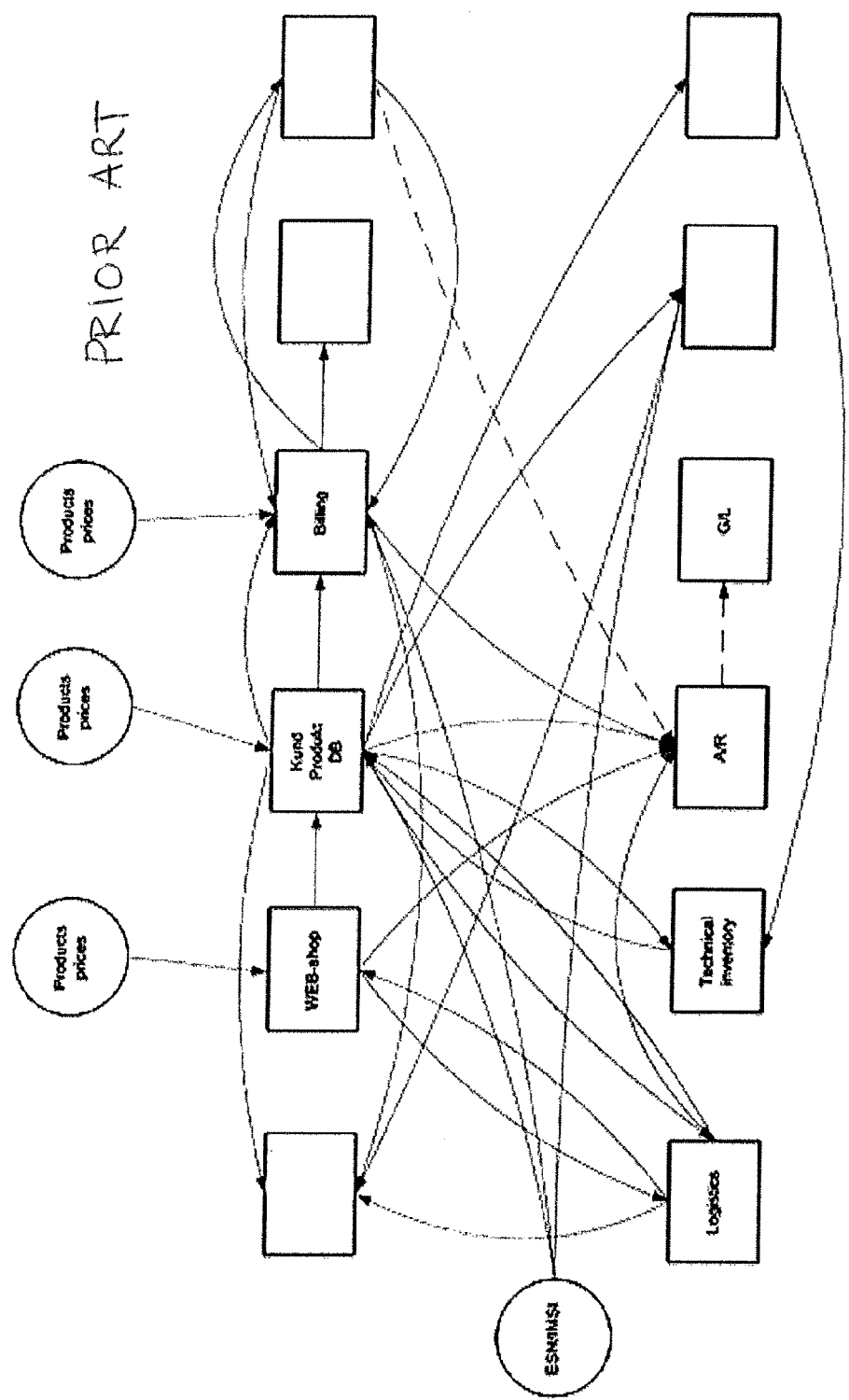
FIG. 1 shows the prior art, wherein a computer system arrangement with the integrations necessary to combine a typical set of subsystems used by an operator.

In the drawings, similar details are denoted with the same reference number throughout the different embodiments. In the various embodiments of the computer system arrangement, CSA, according to the invention the different "boxes"/ subsystems are denoted. The "boxes"/subsystems shown in the drawings are by way of example only and can within the scope of the invention be arranged in any other way/ combination.

For instance the number of "boxes"/subsystems can be less or more than the number shown in the drawings.

FIG. 1 illustrates a known computer system arrangement of this kind having the integrations necessary to combine a typical set of subsystems used by an operator. It is to be noted that product prices in this example could be inserted in several places. Each line between subsystems illustrates a need to communicate information and signals between the subsystems, initiated by one side or both sides. In order to make such communication possible, various adaptations between supported physical interfaces, logical interfaces, buffering, etc. is necessary. For instance, it may be necessary to transform units, formats, etc. It is also necessary for each system to know exactly from what other subsystem to retrieve information. For instance, the address may be fetched from one subsystem, whereas the telephone number may be fetched from another. The address may be in three lines with a country code that needs to be translated to a country name etc. Each such communication can also suffer from errors that need to be handled appropriately. This development activity and testing is referred to as "integration" between subsystems in this application.

Figure 2:
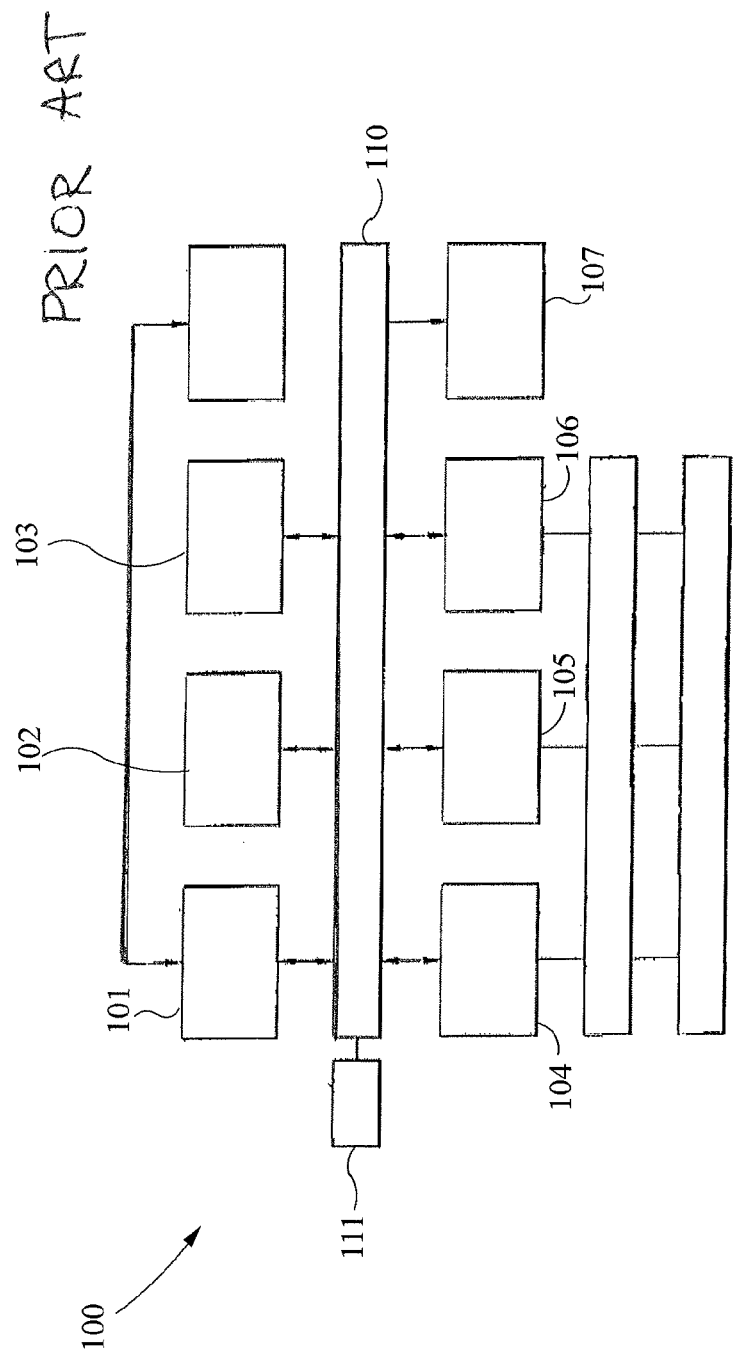
FIG. 2 shows a known principle for integrating subsystems by using an integration bus to facilitate the communication between the different subsystems. Extensive integration is still required to adapt the data between each origin and destination system.

FIG. 2 illustrates another known computer system arrangement 100 for integrating subsystems 101-107 by using an integration bus 110 to facilitate the communication between the different subsystems. A server 111 is connected to the bus 110. Extensive integration is still required to adapt the data between each origin and destination system. Even though the integration bus simplifies the physical communication between subsystems, including some basic data mapping and translations, it still effectively performs the task of adapting the data between each combination if source and destination system. Each subsystem also need to know things about the system on the other side and need to include adaptations to each other subsystem it needs to communicate with. Therefore, the integration bus concept does actually not reduce the number of integration cases that need to be actively developed, tested, and maintained even though it makes the process a bit simpler.

Figure 3:
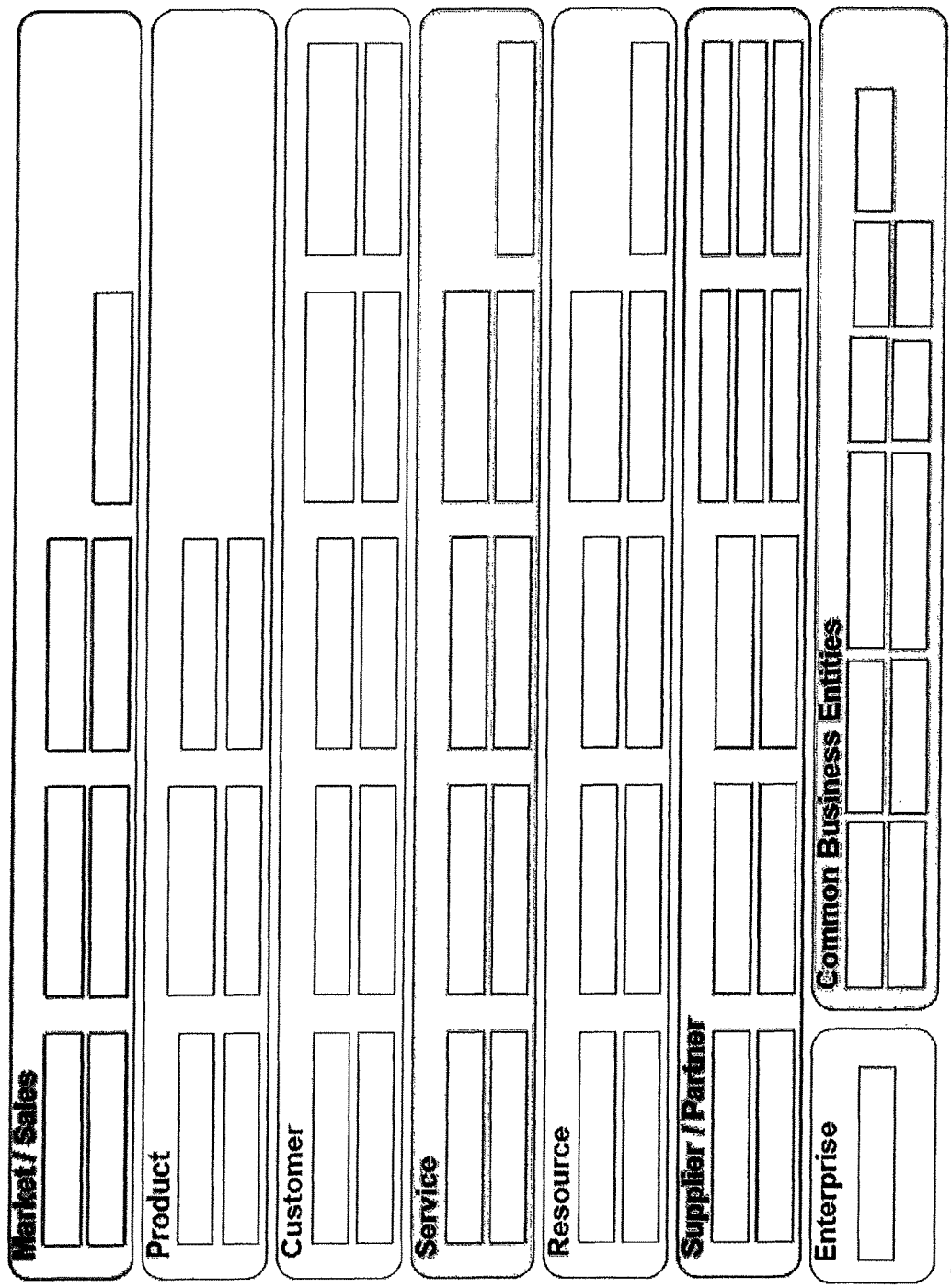
FIG. 3 shows a known structure for an information model (example from the association TM Forum, TeleManagement Forum). It is furthermore known that adherence to such a common information model can simplify exchange of data between subsystems.

FIG. 3 illustrates yet another known computer system arrangement for an information model. It is furthermore known that adherence to such a common information model can simplify exchange of data between subsystems because it minimizes needs for complex translations between different information models. However, it does not reduce the number of integration cases even if adhered thereto, it just simplifies each integration. Each entity is thereafter broken down into a more detailed information model not shown here.

In FIGS. 4a-d, 5, 6, 7, 10, 11, and 12a the subsystems are denoted as follows: 3a denotes "CRM, Self Service and IVR", 3b "Web Shop", 3c "Product Database", 3d "Accounting System", 3e "Number Database", 3f "Revenue Assurance", 3g "Credit Card", 3h "Customer Database", 3i "Billing System", 3j "Logistics", 3k "Provisioning System", 3l "Credit Control", 3m "Trouble Ticketing", 3n "Inventory", and 3o denotes "Operations Support". Furthermore, 3p denotes "Credit Card company", 3q "Bank", 3r "Pre-paid Account", 3s "Top Up Function", 3t "Reseller Web", 3u "My pages", 3v "Product configurator", 3x "Invoicing", 3y "G/L (Navision)", and 3z denotes "Stock (Navision)". Throughout all drawings, the adaptors and connections, 23 and 24, respectively, are each denoted with the same index letter as the corresponding subsystem 3.

Figure 4A:
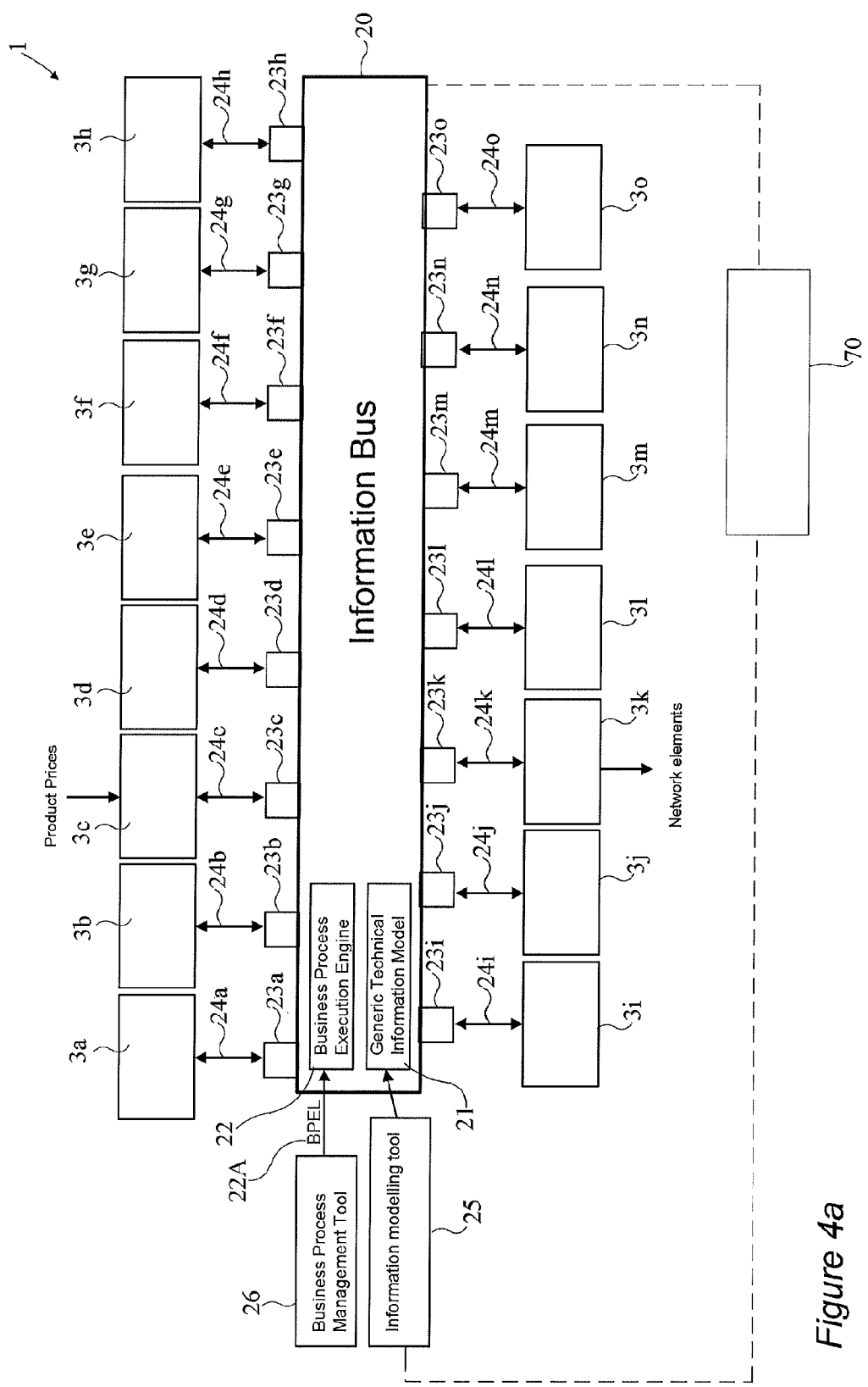
FIG. 4a shows a preferred version of the invention, using an information model as an inherent part of the bus.

FIG. 4a illustrates a first embodiment of a computer system arrangement according to the invention, using an information model as an inherent part of the bus 20, and as an example using BPEL 22A (Business Process Execution Language) for the process execution and programming of the BPEE 22 (Business Process Execution Engine). Each subsystem 3a-o may have many external connections not passing through the bus (only a few examples are indicated in FIG. 4a). The data mapping is performed in each adaptor box 23a-o. This is the version mainly described in the text of this application as an example of implementation. Of course the number of boxes 23a-o can be varied in accordance to the implementation as such.

The computer system arrangement according to the invention comprises a bus arrangement 20 having connections 24a-o to each one of said plurality of appli-cations 3a-o. The bus 20 is arranged to interpret between each application 3a-o and to orchestrate incoming and outgoing requests from each application 3a-o. The bus arrangement 20 includes: a generic information model 21 defining a set of generic parameters 61 in relation to the application parameters 70a, 70b of each application 3a-o, adaptor means 23a-o arranged to interconnect each connection 24a-o with said generic information model, said adaptor means 23a-o together with said generic information model 21, in connection with an incoming request, being arranged to map parameters of that individual data model 70a to said generic parameters 61, and means arranged to transfer said mapped generic information model 6 together with the request to a process execution engine 22. Furthermore, the process execution engine 22 includes means arranged to handle said request to identify a corresponding adaptor means 23a-o to which said request was directed, and uses the corresponding adaptor means 23a-o together with said generic information model 21 to remap said request to the individual data model 7b of the application 3a-o to which it is was directed. The applications, the adaptor means and the connections in between are in all figures generally denoted with the reference numbers 3, 23 and 24, respectively, but can also be marked with an index to show their mutual association or with a specific reference number.

Furthermore, FIG. 4a presents an advantages embodiment wherein there is main use of bus and process monitor 70, which may be used to monitor this state of the bus. For instance, it's possible to view where requests may queue up, errors may occur, timeouts may occur, delays may occur and other performance statistics. In this way it will be possible to identify possible problems, e.g. delays, to identify suitable actions (e.g. increase some bandwidth, computer performance, etc.) and to check how each system is performing. This information can be correlated with a business process defined in the business process management tool 26 in order to correlate the performance with each business process. Accordingly, it facilitates to identify what processes are affected by a certain problem. The other way around, if there is an observed performance problem with a certain process, tool 70 can help to identify what adapters/applications the problem seems to occur. Further, it can be used to drive business related information such as increased customer activity, churn, etc. that can accumulate activity from several applications.

Figure 4B:
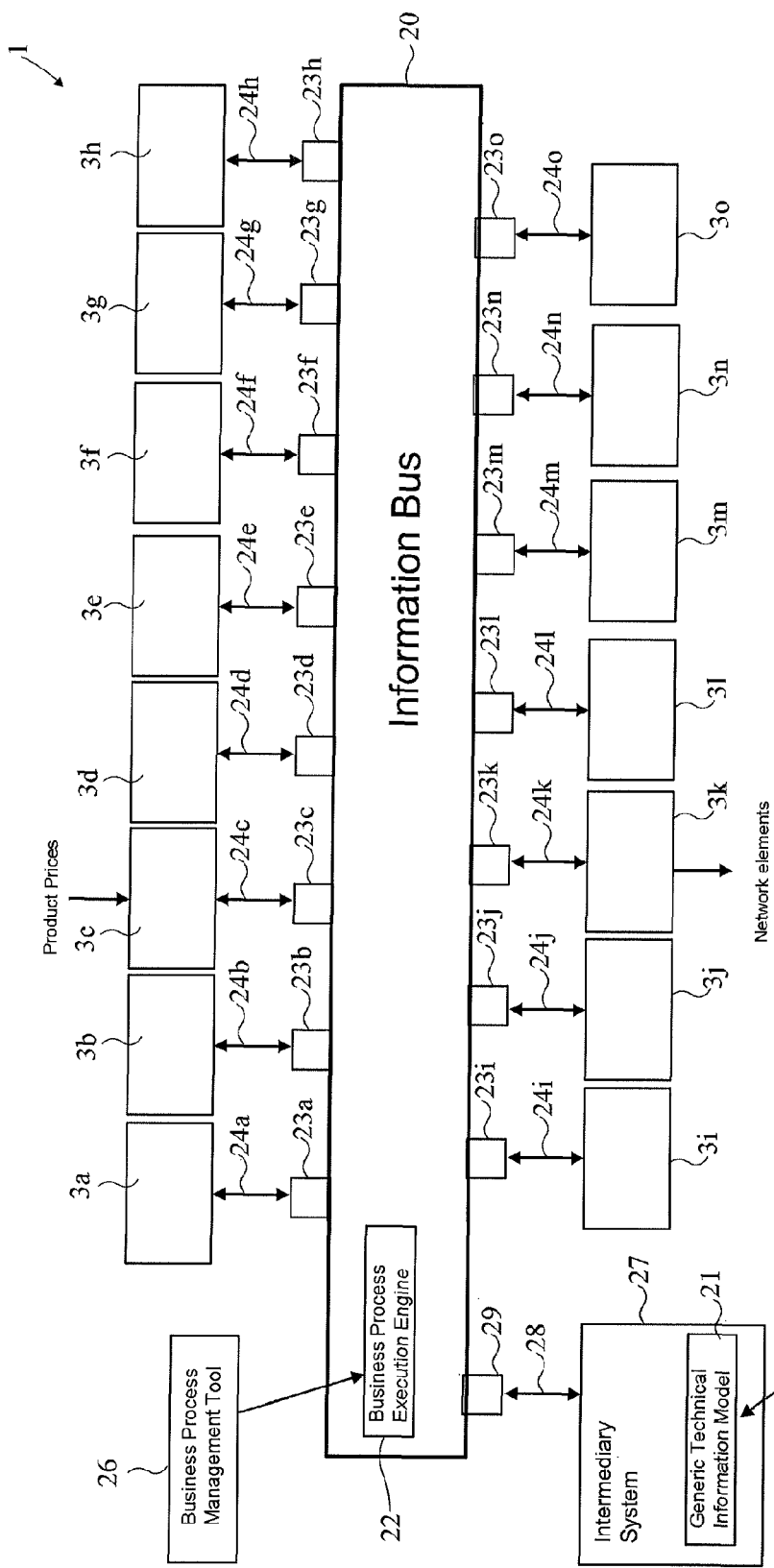
FIG. 4b shows another version of the invention, where the information model is used in an external system through which all information will pass. In this case, the information bus itself is a conventional implementation but used in a new context, since it adapts the information to the external system with the translation to/from the common information model.

FIG. 4b illustrates a second embodiment of a computer system arrangement according to the invention, where the generic information model 21 is used in a separate system 27 through which all information will pass and be remodeled. In this case, the information bus 20 itself is a conventional implementation, but used in a new context since it adapts the information to the connected subsystems 3a-3o, by means of using a specific adaptor 29, having a connection 28 to a separate, external subsystem 27 including the GTIM 21 (Generic Technical Information Model) performing the translation to/from the technical information model and communicating with the BPEE 22, within the bus 20. The subsystem 3i is a billing system including invoicing, CDR collection, etc. It should be noted, that the information passes the subsystem 27 twice, viz. the first time on the way in from the source before the business process takes over, and the second time on the way out to the target after the business process.

Figure 4C:
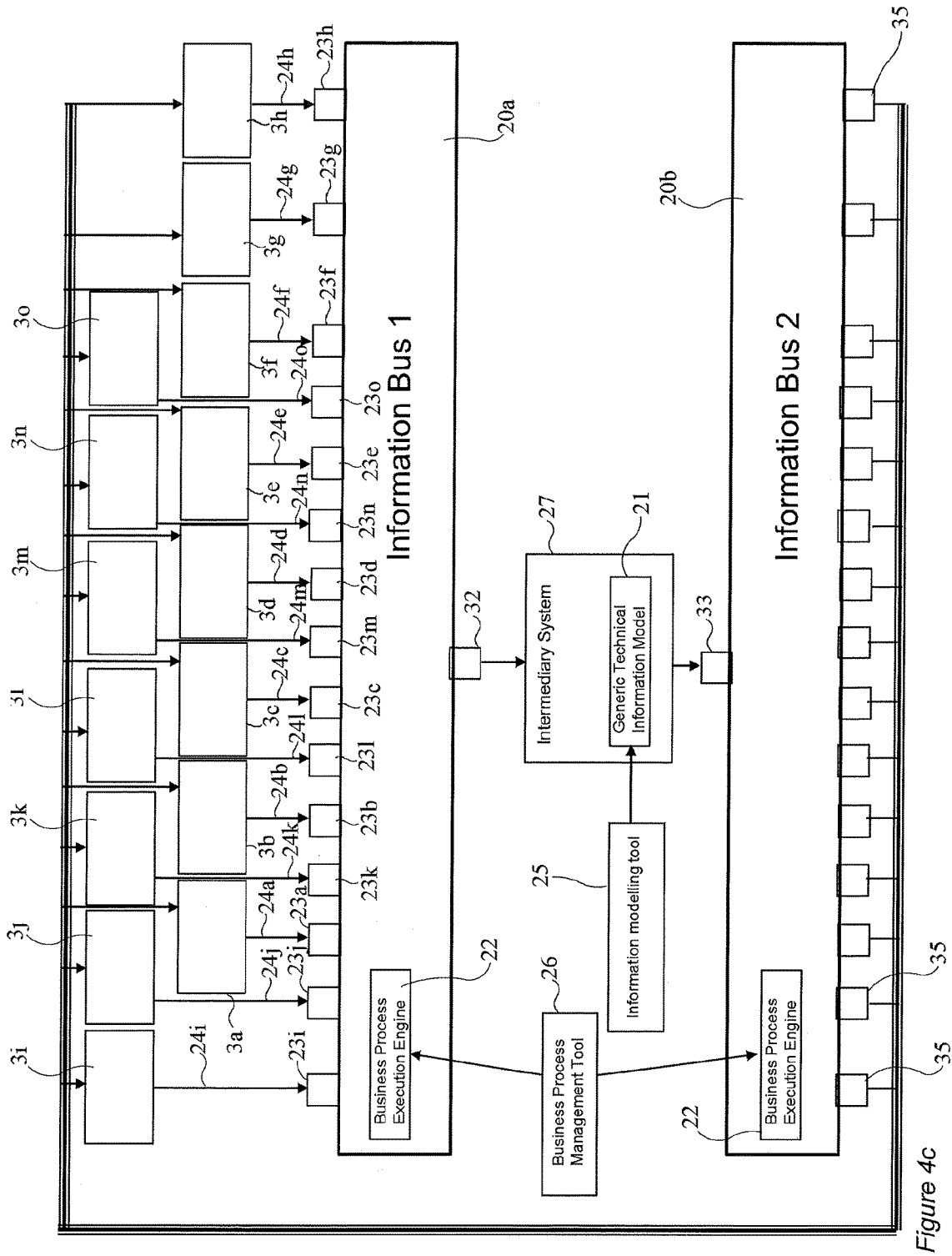
FIG. 4c shows yet another version of a computer system arrangement according to the invention where two different integration buses are used together with an external system that uses the technical information model according to the invention.

FIG. 4*c* shows a third embodiment of a computer system arrangement according to the invention in which two different integration buses 20*a*, 20*b*, by means of one adaptor each 32 and 33, respectively, are used to operate with one common external subsystem 27 that contains the technical information model 21. The buses 20*a*, 20*b* are connected to each application 3*a-o* for outputs and inputs, respectively. Hence, each subsystem 3*a-o* is connected to one bus 20*a* to send information for translation/execution, via adaptors 23*a-o* and to the other bus 20*b*, via corresponding adaptors 35 and/or adaptors 32 and 33, to receive processed information.

Figure 4D:
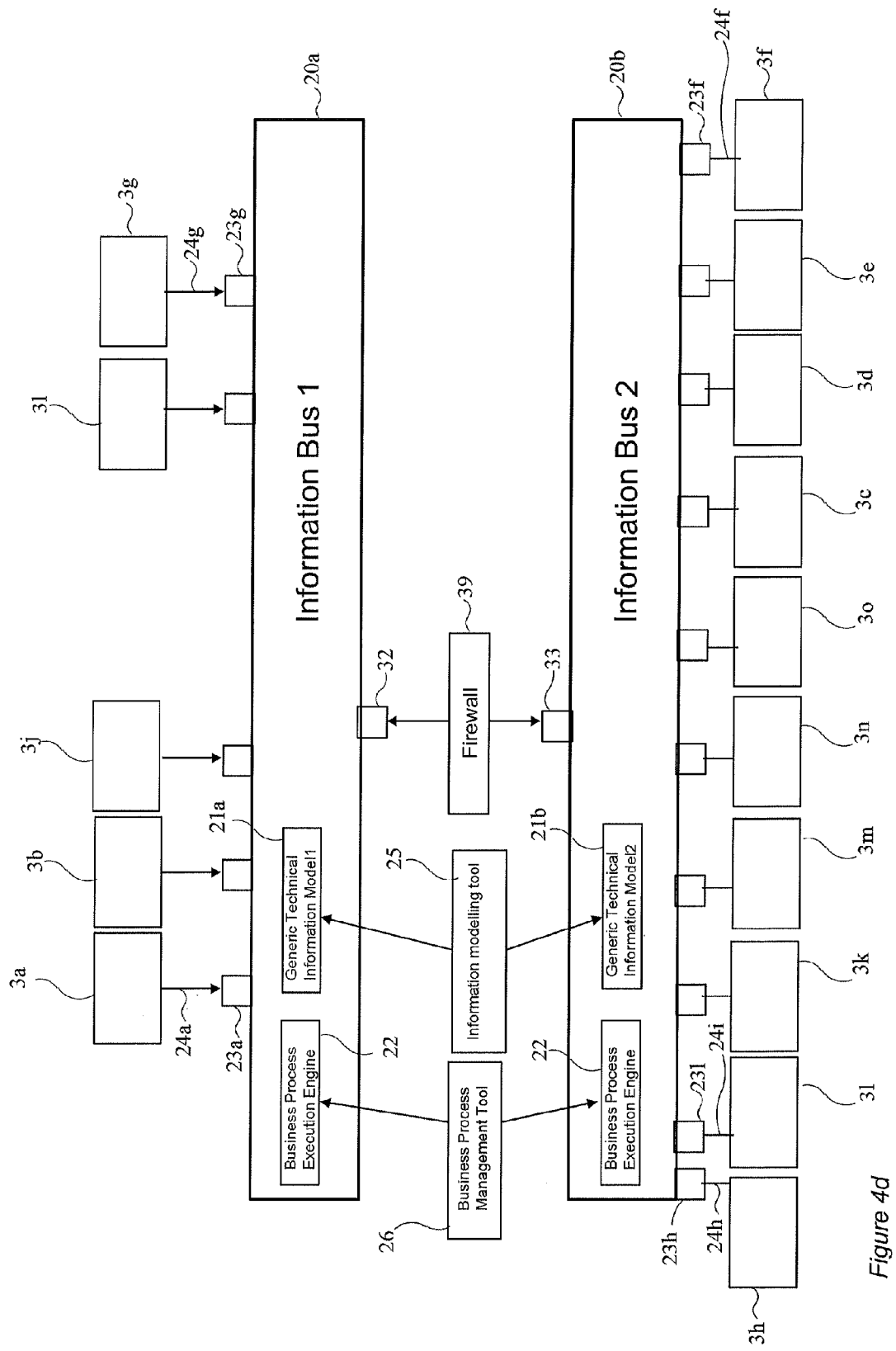
FIG. 4d shows yet another version of a computer system arrangement according to the invention where two different integration buses are used with a firewall device connected therebetween.

FIG. 4*d* shows a fourth embodiment of a computer system arrangement according to the invention with two buses 20*a*, 20*b*, wherein a firewall 39 is used to separate more public systems from more internal systems with higher access security.

The solution shown in FIG. 4*a* combines the solutions described above such that the bus 20 itself has its own information models (standard or proprietary) and that all information translations goes through the bus 20, basically translating it twice; once from the origin system 7*a* (see FIG. 9) to the bus information model 6, via an "incoming" adaptor 23, and once to the target system information model 7*b*, via an outgoing adaptor 23. This includes any required protocol and format conversions (the classic role of an information bus), but may also include combining information from a variety of sources and subsystems, which provides further advantages.

In principle, this can reduce the number of integrations from about n(n−1) to about 2n. This is different from existing solutions with integration hubs or similar in that it strictly uses the information model in the bus such that an origin system does not have to be aware of changes in formats, protocols or concepts used in the target system or if subsystems are divided or merged. Therefore one subsystem can, for instance, replace another without affecting all the other subsystems after just integrating it with the information bus and making necessary translations to the information model in the bus.

As a comparison, participants in a meeting of representatives with n different native languages need n(n−1)/2 interpreters if each interpreter only can translate between two languages (i.e. in both directions). If the number of languages gets large, the number of interpreters rapidly explodes. With 10 languages represented, 45 interpreters are needed. With 100 languages 4950 interpreters are required—at a cost and logistic complexity far beyond their value. However, if all interpreters can translate to/from English (or some other common information model), only n interpreters are needed, in this case 10 (or 9 if one native language is English) instead of 45. If 100 languages are represented, 100 interpreters are needed instead of 4950, etc. This illustrates the difference in integration complexity between known technology and the computer system arrangement according to the invention. To use a shared data model, which is also a known technology, corresponds to everybody using English.

As an alternative to have the information model 21 in the bus 20 as in FIG. 4*a*, it can be placed in an external unit 27 to the bus 20 as in FIG. 4*b*, thus a kind of system that all information passes through on its way from an origin to a destination system. In this case, there is no information model unit 21 in the bus 20 itself. Rather, conversions are made to/from the information model 6 (see FIG. 9) in the external system 27. The advantages and principles would in this case be the same except that the bus itself does not need the capability to include an information model unit 21. Instead, the information model unit 21 is implemented in the external module 27. However, which alternative is preferable depends on the implementation. Two alternative principles are shown in FIGS. 4*b* and 4*c*.

In a similar way as the information model 6 (see FIG. 9) is handled, all processes are defined in a process management and design tool 25. The processes are then run through integration with, for instance, the BPE engine 22 that is connected to the bus 20 via connection using BPEL 22A. See FIG. 4*a*.

The information model may be described as consisting of two different but corresponding models, one used in the organization which is mapped to the one implemented inside the information bus 20.

Figure 5:
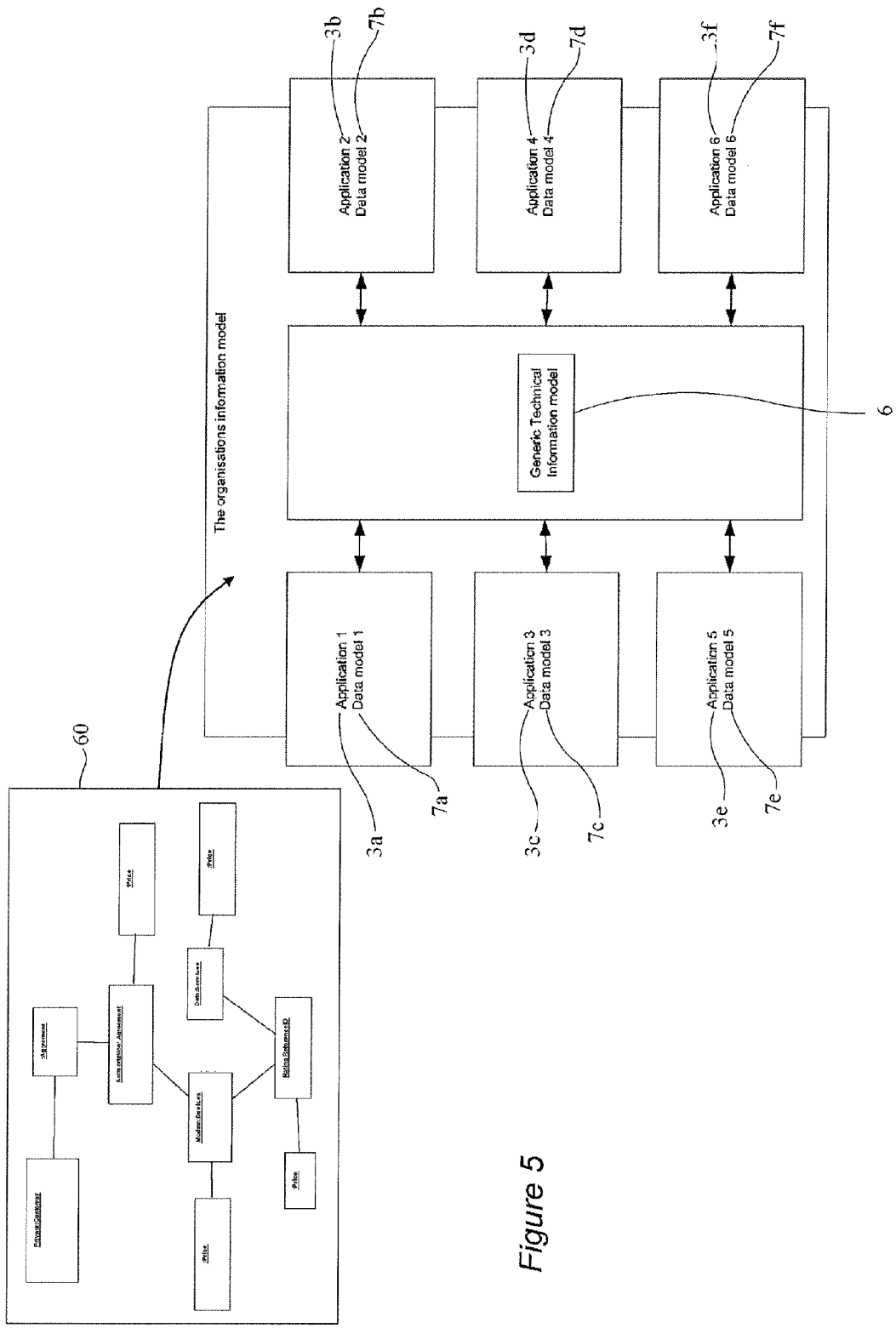
FIG. 5 shows the relationships between information models in the bus and in the organization.

FIG. 5 schematically illustrates the relationships between information models in the bus 20, in the applications 3*a*-3*f* and in the organization. The organization information model (OIM) 60 defines the concepts and their relationship that the organization is using, e.g. a Customer is called a "Customer". These concepts are used in the organizations day to day life. The Generic Technical Information model 6 (GTIM) defines the concepts and their relationship on an accurate and technical level. The OIM 60 is mapped to the GTIM 6 as well. In the preferred mode it is possible to use externally defined models like the TMForum SID model, as it is or modified. Each connected application 3*a-f* has a data model 7*a-f* (ADM) defining the concepts and relationships within that application. Each ADM 7*a-f* is mapped to the GTIM 6 used within the iBus 20, so that data transformations may be done in each adaptor 23. The ADM:s 7*a-f* are therefore also mapped to the OIM in a manner.

Figure 6:
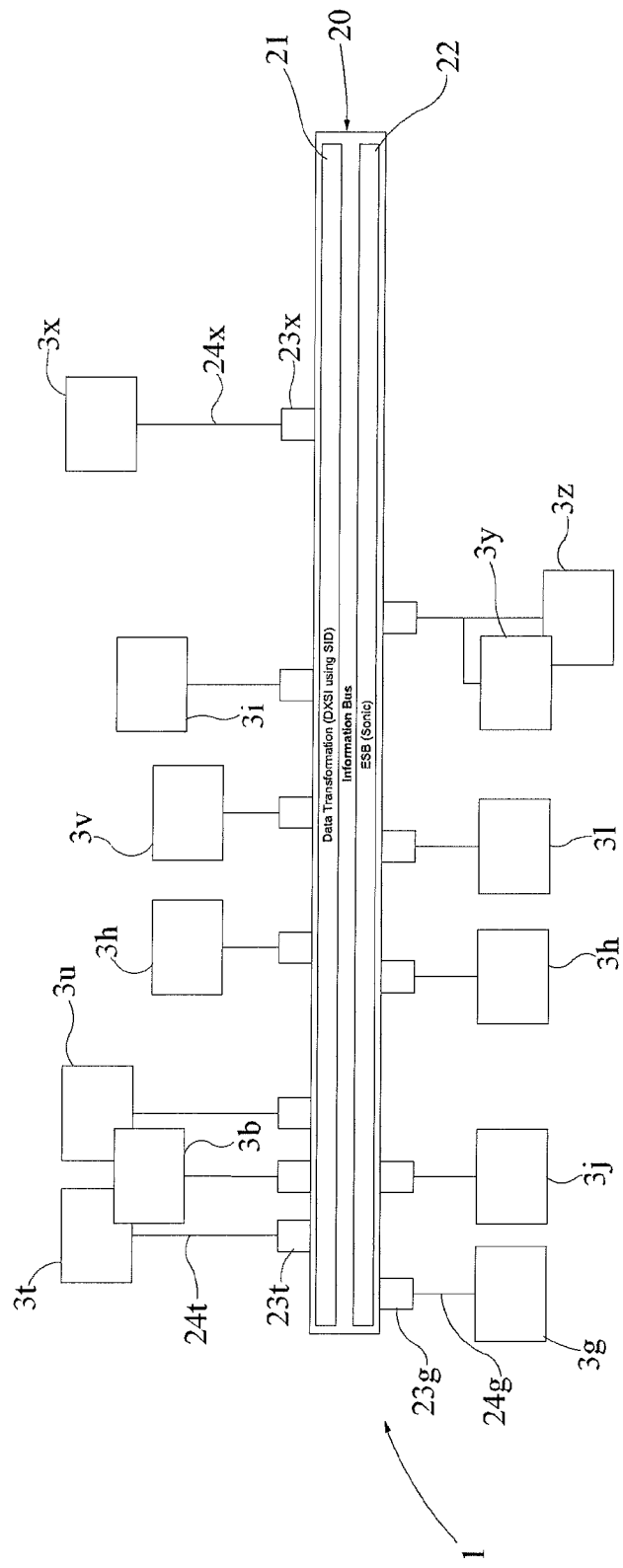
FIG. 6 shows a typical implementation of the computer system arrangement according to the invention using components available on the market.

FIG. 6 illustrates a fifth embodiment of a computer system arrangement 1 according to the invention. By means of this embodiment a typical implementation of the computer system arrangement is illustrated using known components available on the market, e.g. using Data transformation unit 21 based on DXSI using SID, and an Execution engine 22 in the form of ESB (Sonic). Other known systems of this kind may be used.

Figure 7:
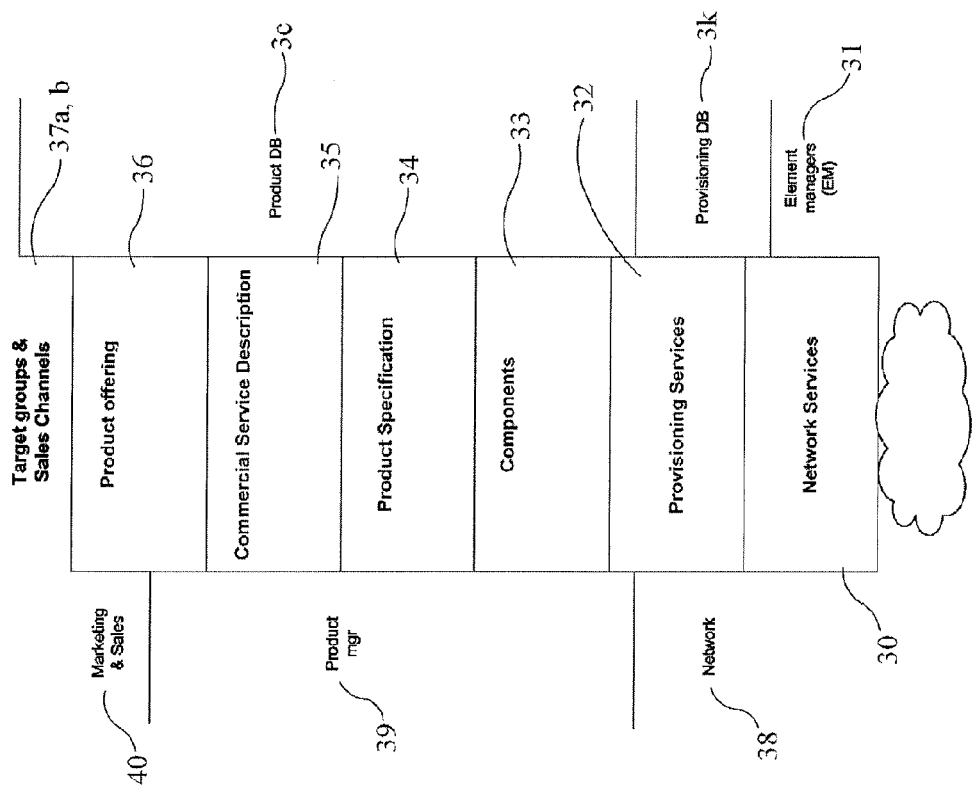
FIG. 7 shows how for instance a product definition is built up and how it relates to different parts of the organization and different subsystems.

FIG. 7 illustrate how for instance a product definition is built up and how it relates to different parts of the organization and different subsystems, e.g. 3*c* and 3*k* of the system in FIG. 4*a*. It, for instance, illustrates the role of a product database 3*c* in a possible solution. When looking from bottom up, in this example the products base, is the Network Services 30, the services that exists in the network. They are managed by Element Manager Applications 31. Sometimes several of these Network Services 30 needs to be combined in order for setting up the functionality in the network, which is done by using the Provisioning Service 32, which is mastered and managed by the Provisioning DB 3*k*. This also enables to isolate the Element Managers 31 from the higher levels of the product hierarchy, so these definitions become independent from the different vendors of Element Managers 31. The upper level of the hierarchy is managed by the Product DB 3*c*. In order handle the complex products sold, they are structured in two main layers, the technical definition layer (Components Specification 33 containing Services, Resources and Technical Attributes, and Product Specification 34 containing Technical products and Technical rules) and commercial definition layer (Commercial Service Description 35 containing Commercial Products, Bundles, Pricing Plans and Discount rules, and Product Offerings 36 containing Special Offers, Commercial rules and Standard Offers). A product specification is made up of one or more components and knows the rules on how these can be combined and utilized. A Commercial Service Description 35 adds commercial rules, price plans, discount plans etc and can only use what is defined on the Product Specification 34 level. The Commercial Service Description 35 cannot be sold to a customer, only a Product Offering 36 can be sold. Many Product Offerings 36 can be defined from a Commercial Service Description 35. The Product Offering 36 also knows through which Sales Channels 37a it can be sold as well as which Target Groups 37b that are targeted. All levels in the hierarchy are version handled and also have lifecycle information, like maturity state, validity dates, etc. To the left you can see the proposed responsibility for each layer, where the Network Department 38 might be responsible for the Network Services 30 and the Provisioning Services 32, the Product Management 39 for the Technical and Commercial Layers, but where Marketing and Sales 40 are responsible for the part of the Product Offering 36 that the customer will see and receive.

Figure 8:
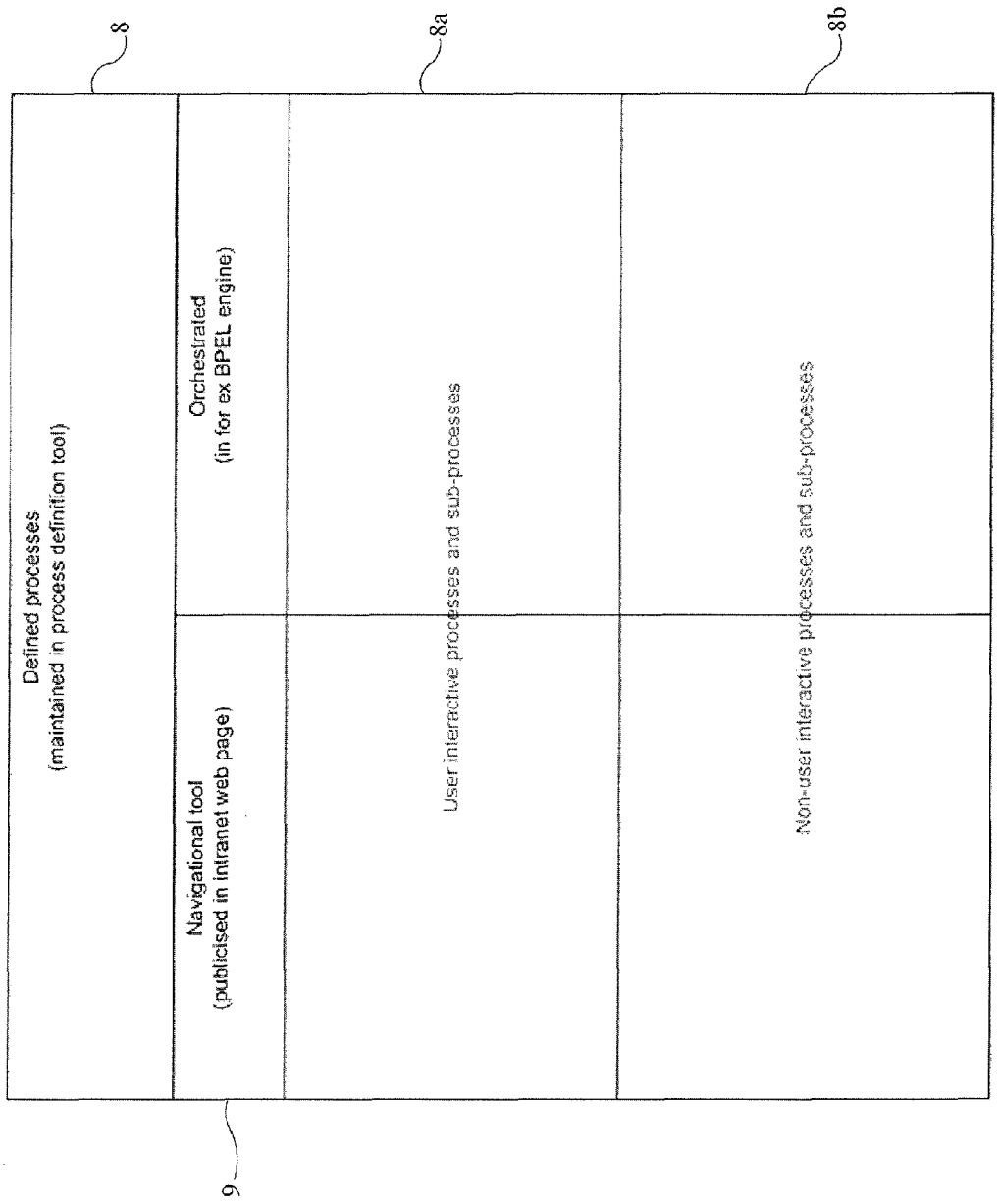
FIG. 8 shows schematically process relationships.

FIG. 8 illustrates process relationships. All the defined processes 8 are handled in a process management tool 26 (see e.g. FIG. 4a). This tool 26 produces process schemas 8a, 8b that can be visible and navigated, on a navigation tool 9, e.g. on an internal WEB-page as a kind of guidelines to the organization. The tool 25 is also used to produce BPEL or other intelligent code to be utilized in the iBus 20 by for ex a BPEL engine 22. This relationship is two way. The processes are orchestrated differently depending on if they are user interactive processes 8a or non-user interactive processes 8b. Thanks to coordinating both kinds of processes by means of the same tool 26 it is possible to achieve system integration with a high degree of control/accuracy in a complex structure, and to perform changes within the system in a flexible and well controlled manner, safeguarding cost-efficient and reliable operation of the system.

Figure 9:
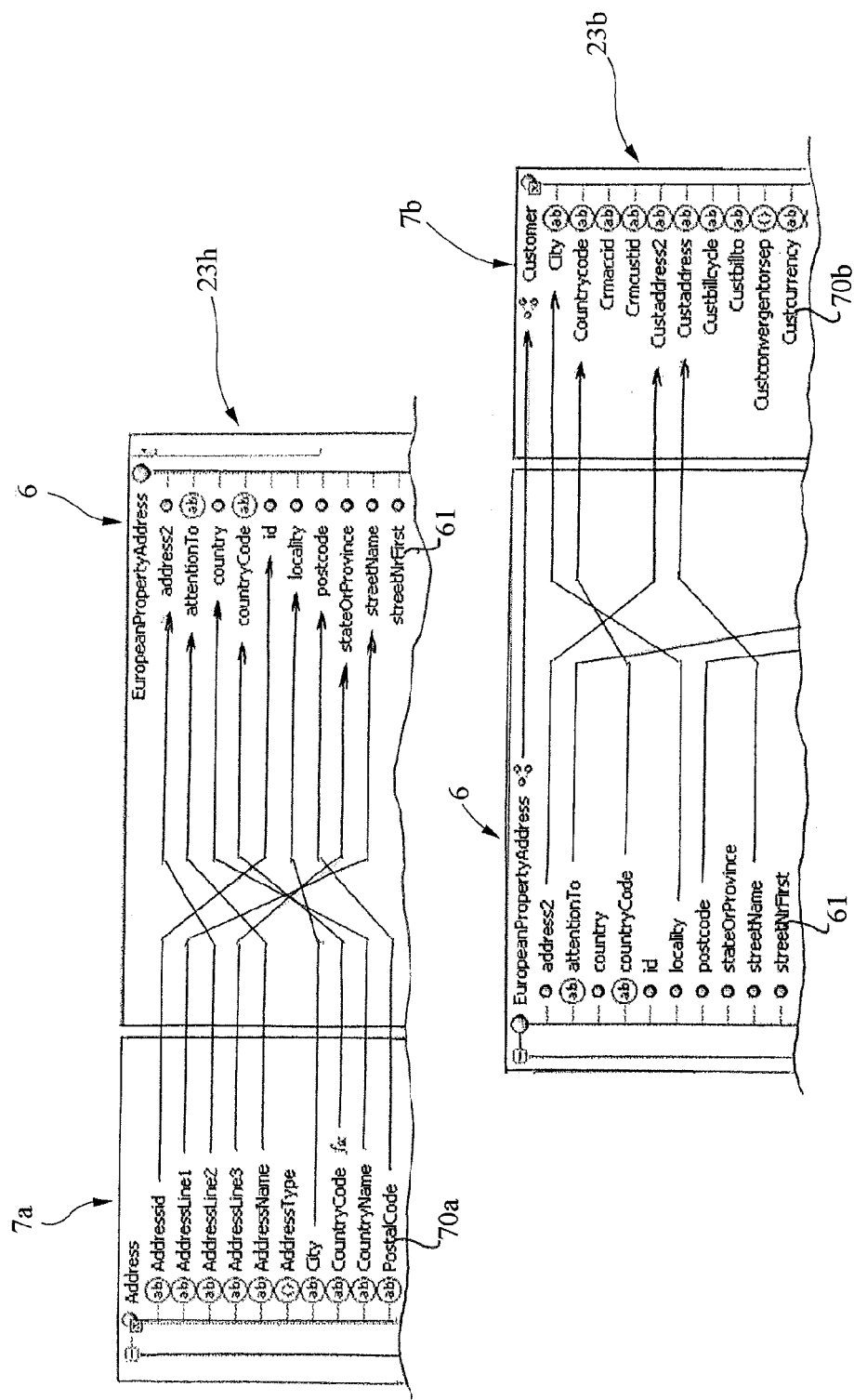
FIG. 9 shows schematically data mapping of address fields between two different applications and the generic data model.

FIG. 9 is an example of data mapping or data translation between an application 3 connected to the bus 20 and the Generic information model 6 (GIM, preferably a CRM system) used in the GTIM 21 in the bus 20, according to the invention. For example, it is shown that in a first adaptor 23h the address field 61 is mapped from a first ADM 7a (e.g. used within a Costumer Database 3h), over to the GDM 6 and via a second adaptor 23b, from the GDM 6 to a second ADM 7b (e.g. used within a webshop 3b).

The computer system arrangement according to the invention is adapted for minimizing communication and integration complexity between a plurality of software applications, wherein at least a subset of these applications 3a-o (see e.g. FIG. 4a) has an individual data model (ADM) 7a-o, each defining an individual set of application parameters 70a-o, and wherein a first mapping within a first adaptor 23 is first achieved from an ADM 7a belonging to an incoming request 70a to the bus 20, whereby the GTIM 21 translates it 70a into a standard object/parameter 61 using the GIM 6. Subsequently, by means of the BPEE 22 the translated object/parameter is directed to one (or more), i.e. at least to a second, adaptor 23, wherein the translated request 61 is remapped into an object/parameter 70b according to the ADM 7b of the application 3 to which the incoming object/parameter 70a was intended.

As is evident for the skilled person, the invention can be used and adapted for slightly different applications. Four examples are given below:

1. Handling of pre-payment and real-time billing and credit checking. Cellular operators or utilities sometimes apply post-payment, i.e. bills are issued after collecting data records and calculating the amount due. In conjunction with the initiation of the subscription, this is normally combined with some assessment of credit-worthiness. This is handled by this invention as described earlier by having access to a credit assessment function (e.g. access to a system that determines credit-worthiness based on certain parameters). However, the invention can also be used for integrating a pre-payment system, where one of the subsystems keeps track of each users account status with functions to credit, debit, and check an account. See illustration in FIG. 10.

Figure 11:
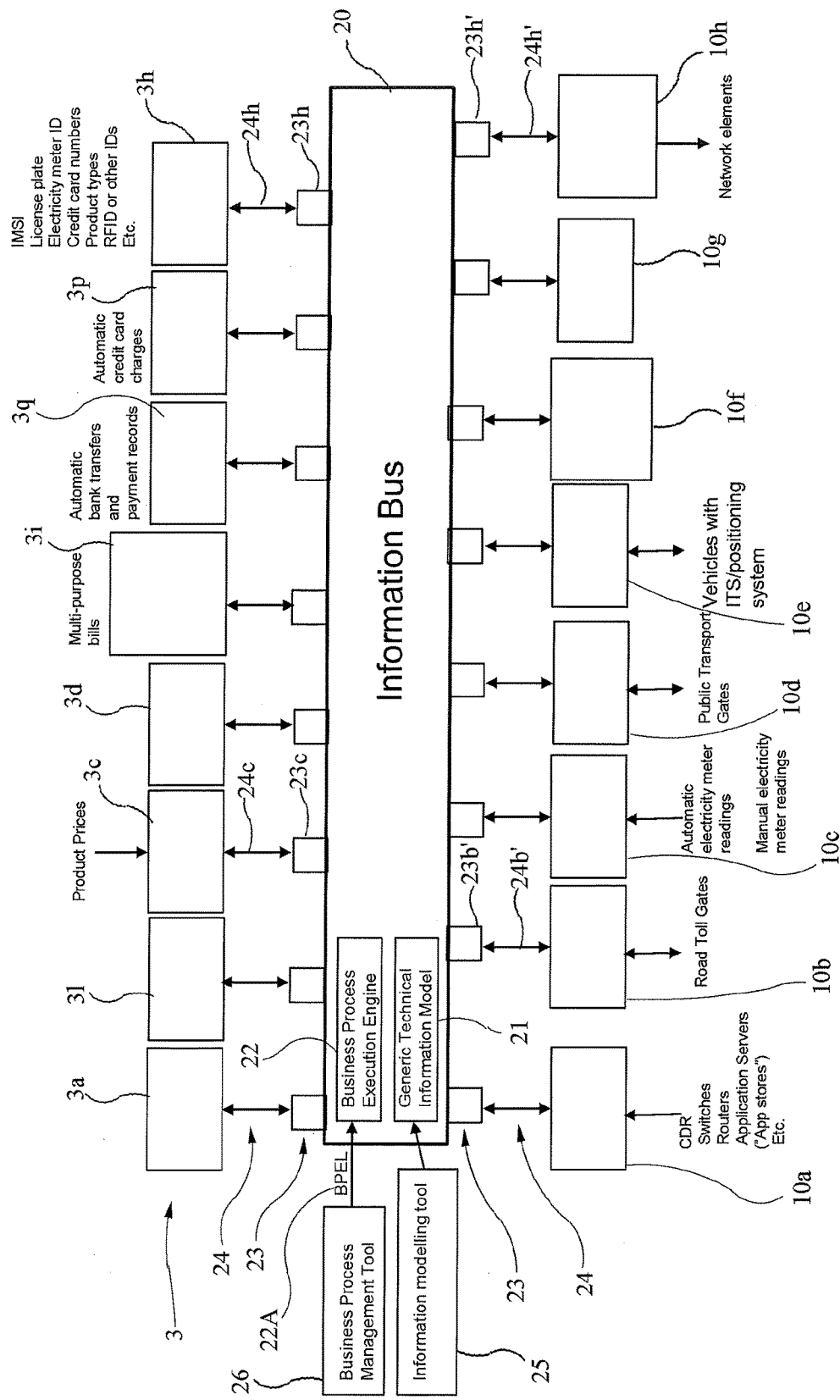
FIG. 11 shows an embodiment of the computer system arrangement according to the invention applied for handling of micro-payments for a variety of purposes.

2. Handling of micro-payment and transformation of single-purpose to multi-purpose payment systems. The invention allows using e.g. a cellular operator's billing, pre-payment credit/debit functions etc. for other purposes than to charge for telephone calls (or an energy company's system to charge for electricity to also charge for other things). One example shown in FIG. 11 is to connect e.g. toll gates, vending machines, and other micro-payments to a mobile phone subscription. This can be done also without using this invention, but the invention makes it much easier to integrate the systems and use solutions already developed for different purposes dramatically reducing the development cost and time to take advantage of the combination effect.

3. Smart Energy Grid. Modern solutions to optimize the production, storage, transmission and consumption of electric energy are often referred to as "Smart Grid". These solutions are dependent on communication and integration between a large number of devices and systems with different origin and function to work efficiently. In fact, this is one of then main barriers for wide-scale deployment of such solutions. Communication can be solved using e.g. a national wireless network with good coverage in e.g. the 450 MHz band. The invention is ideal to simplify also the implementation of Smart Grids as illustrated in FIG. 12.

Figure 13:
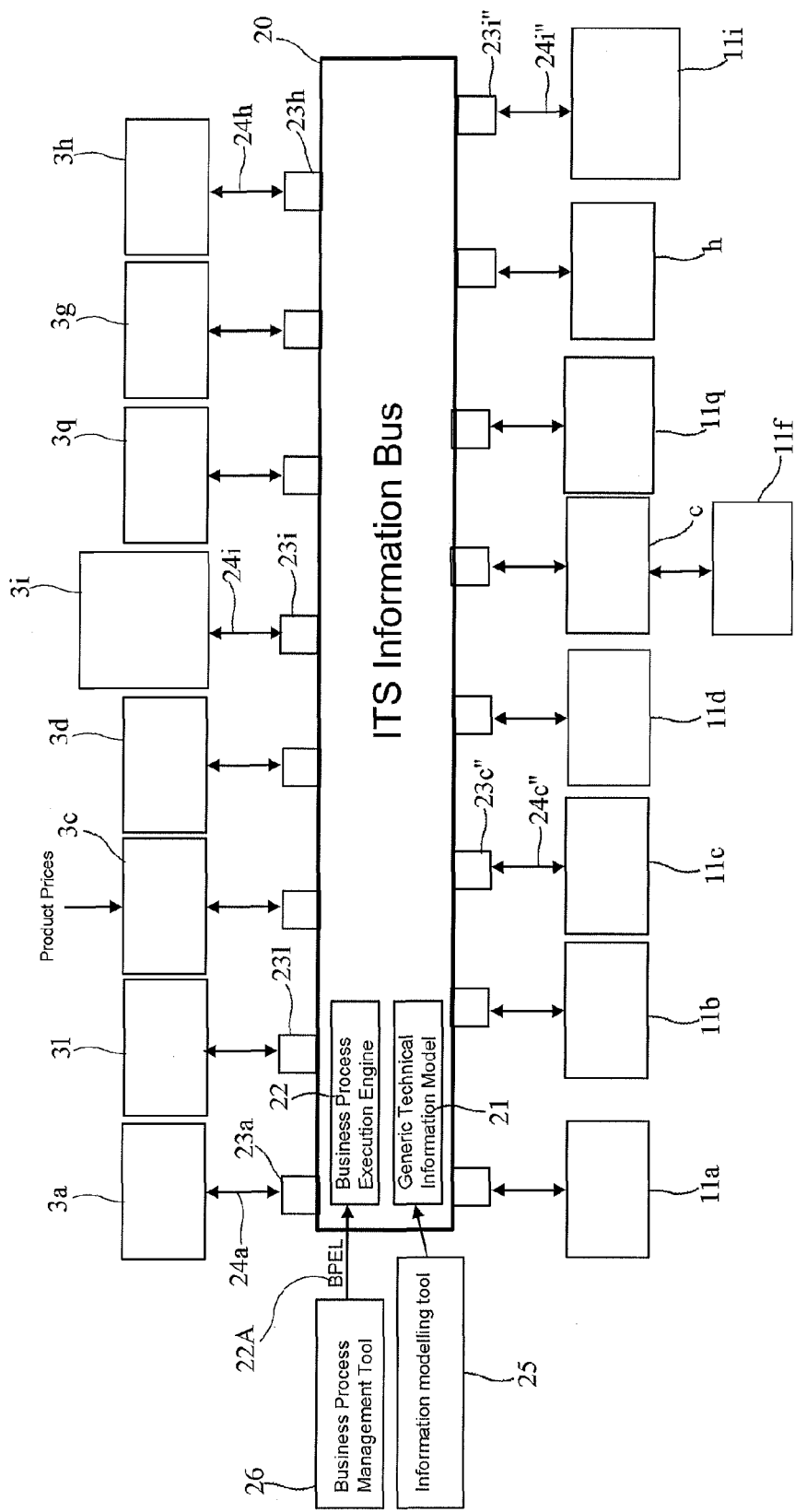
FIG. 13 shows an embodiment of the computer system arrangement according to the invention, illustrating an Intelligent Traffic System where some of the systems may be mobile, using a wireless radio communication system for the communication.

4. Intelligent Traffic System (ITS). The invention does not require stationary systems. On the contrary, stationary subsystems can be combined with mobile systems, for instance vehicles with some sort of identity and properties. FIG. 13 illustrates one example of an Intelligent Traffic System, where the computer system arrangement according to the invention is used to integrate the different systems by using a bus with a generic information model.

Figure 10:
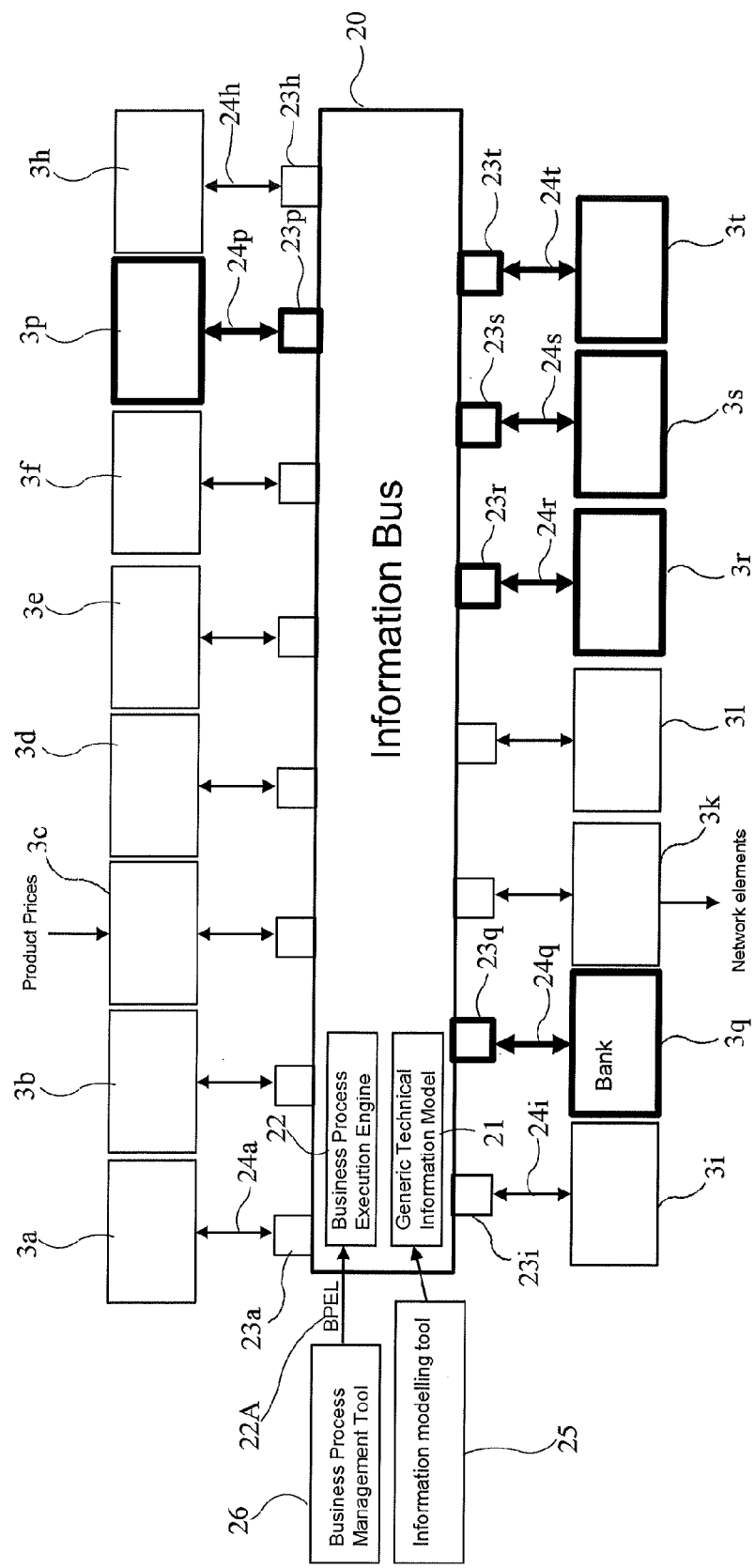
FIG. 10 shows schematically an embodiment of the computer system arrangement according to the invention applied for handling of pre-payment and real-time billing and credit checking.

FIG. 10 illustrates the invention applied for Handling of pre-payment and real-time billing and credit checking. It can be noted that interfaces/integrations to credit card companies 3p, banks 3q, etc. can be re-used and shared by the post-paid and pre-paid systems showing another advantage of this invention when integrations can be used for new purposes (like using a debit function for the credit card company developed for postpaid to also work for pre-paid automatic top-up. The highlighted applications 3p, 3q, 3r, 3s, 3t with corresponding adaptors 23p-t are the key systems involved in the handling of prepaid transactions.

FIG. 11 illustrates the invention applied for handling of micro-payments for a variety of purposes, in this example gaming, application download, public transport, toll gates, ITS and vending machines. Moreover, 10a denotes "Telecom mediation", 10b "Toll gate reader", 10c "Electricity metering", 10*d* "Subway gate reader", 10*e* "Dynamic road toll System", 10*f* "App. And Media Store", 10*g* "Vending Machines", and 10*h* denotes "Cellular Provisioning System".

Figure 12A:
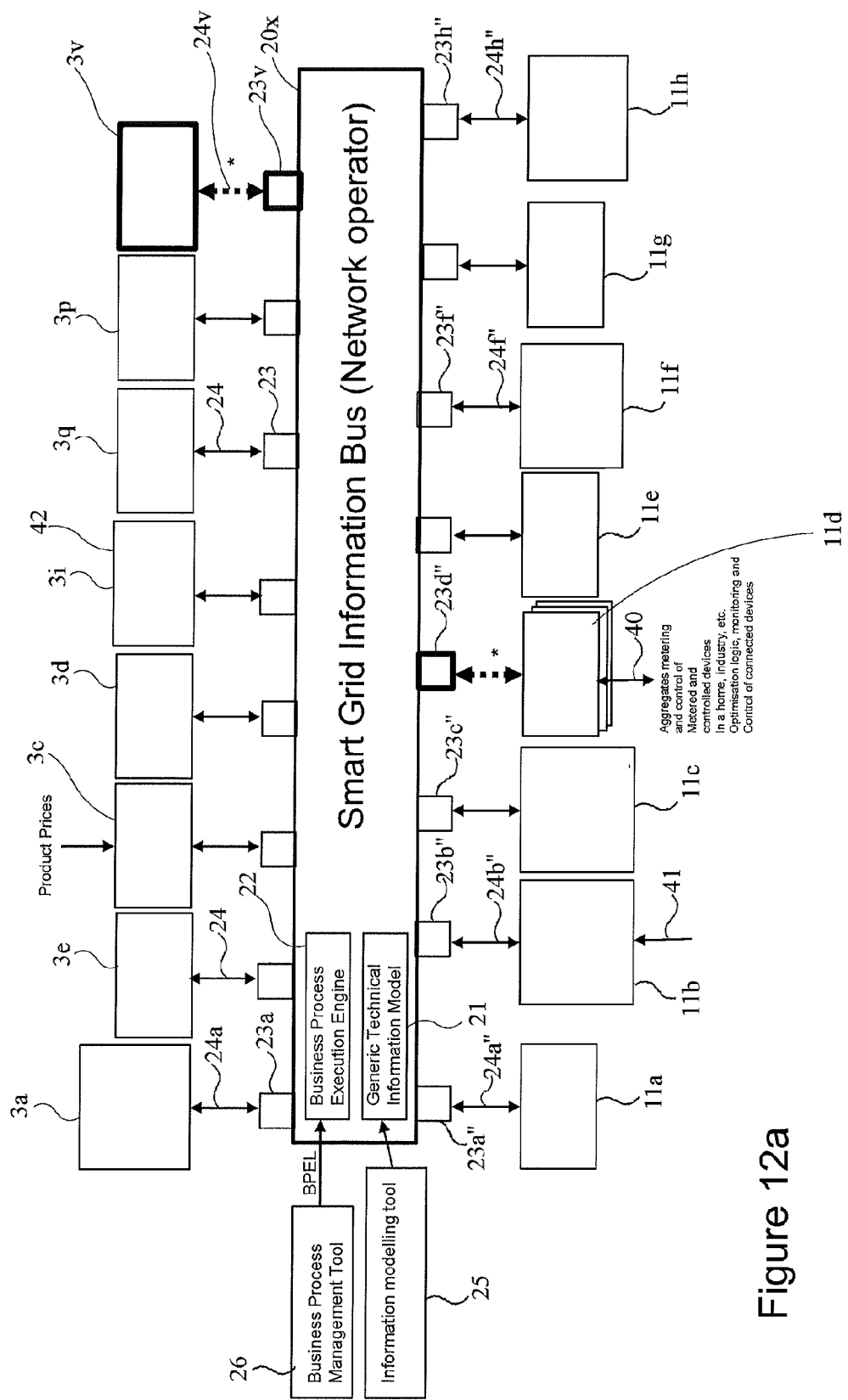
FIG. 12a shows an embodiment of the computer system arrangement according to the invention applied in a Smart Energy Grid to connect a variety of units and systems with different functions.

FIG. 12*a* illustrates the invention applied in a Smart Energy Grid to connect a variety of units and systems with different functions. In this illustration, the invention is used (independently) both by the Power company and in the Home smart meter implementation, with an interface that fully or partly may be standardized or nationally regulated to encourage the development of the smart grids. Each unit in the lower part of the illustration has permanent data and variable data such as topological information about physical connections, capacity, un-utilized capacity, type of device (generating, storing, transmission or consuming), forecasted load or production (e.g. when charging of an electric car has to be completed), price thresholds to increase/decrease production, consumption, storage, etc. Here, 11*a* denotes "Topology database", 11*b* "Optimization, forecasting and trading system", 11*c* "Distribution Network Control/Monitoring", 11*d* "Smart Metering (aggregator)", 11*e* "Power Plant", 11*f* "Storage facility", 11*g* "Electric Vehicles", and 11*h* denotes "Home of Industry Appliance". The Smart meter 40/11*d* may have certain functions to autonomously buy and sell electric energy power, to control non-time critical consumer items in the home or industry (like electric water heaters, air conditioners), etc. depending on the price and user settings. Likewise, the power company can build a system 41/11*b* to optimize and plan its production based on its knowledge about how much consumption can be increased/decreased, cost and capacity for electricity transmission, etc. It could also mean that a wind power or solar power company can make a deal with battery bank owners/electric car owners to store energy in their batteries with certain terms of use. Central accounting and billing functions 42 determine the electricity bills based on data collected from the meters, etc. The operations central of the power company can see any deviations in consumption etc. by matching data from different parts of the network. A home owner can see details not available to the power companies and can set rules for what devices that should go on under what price conditions, or override these settings when necessary. The generic data model in the information bus need to be able to describe all data that needs to be exchanged between the different units, but the bus associated with a smart meter/smart home, does not have to have the same data model as the power company's bus. Different power companies work with different kinds of smart grids and policies for optimization. It may be useful with standardized interfaces between different power companies 3*v* and interface 40*a* (see also FIG. 12*b*) between each customer premise and the power company that contain mandatory and optional information, private and public information (only accessible to authorized users). The information in these interfaces would typically refer to aggregate steerable capacities, etc., current electricity cost for user to decide to e.g. start a device, override normal settings, consumption information (meter reading data), etc. The system is very suitable for stepwise additions of increasingly advanced capabilities and new functions while parts of the network are still of "old" type.

Figure 12B:
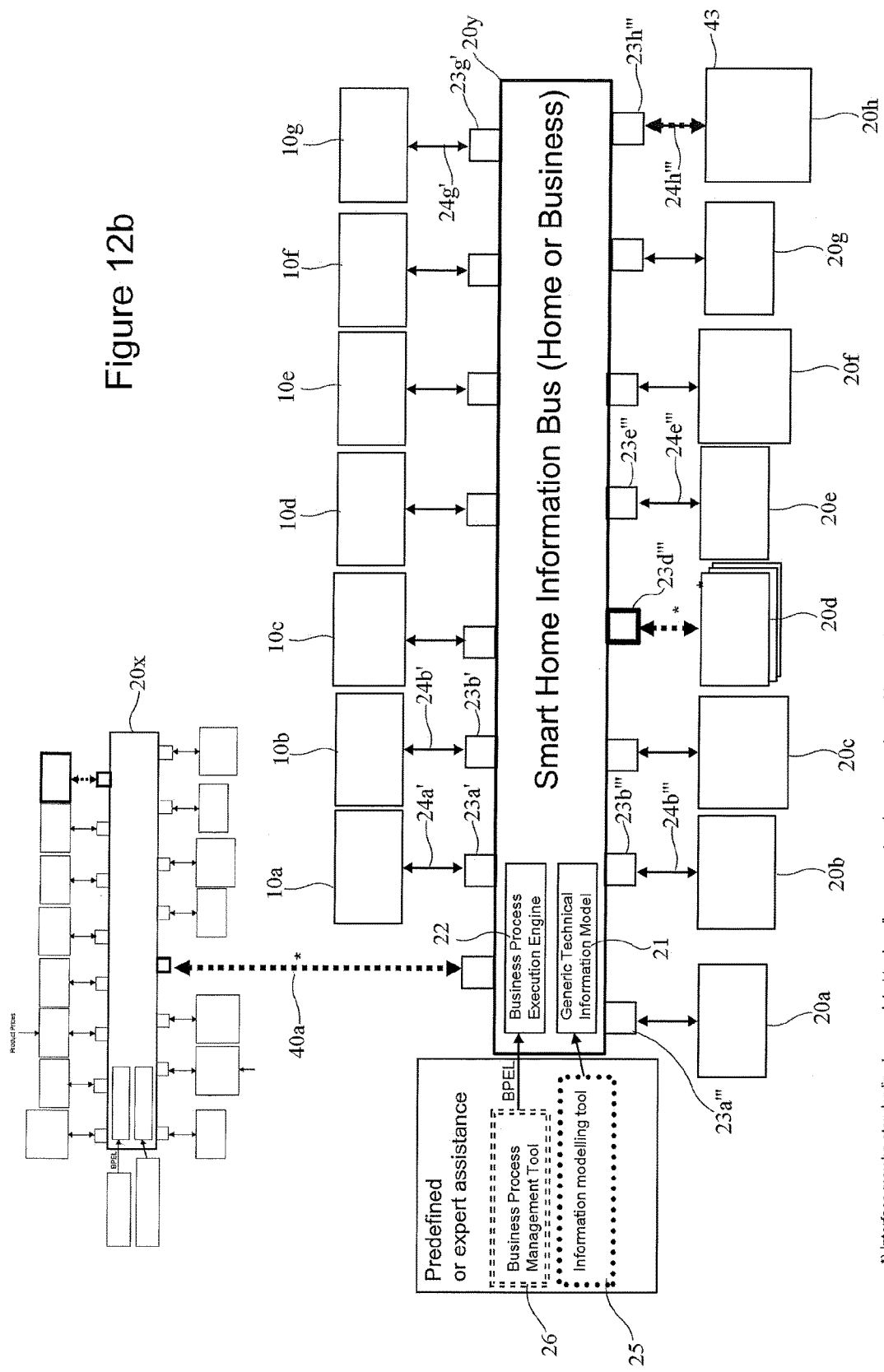
FIG. 12b shows an embodiment similar to FIG. 12a of the computer system arrangement according to the invention, but where the Smart Metering device itself is made up of a home or small business bus.

FIG. 12*b* is the same as FIG. 12*a*, but where the Smart Metering device itself is made up of a home or small business bus, which in itself is a version of the invention, allowing control and optimization of a variety of electricity sources, storage, and consumption devices into a smart home implementation—without giving the energy company access to all private information—only aggregate data, but still allowing very advanced optimization of the home or business energy usage. Here, the subsystem 12*a* denotes "Dishwasher", 12*b* denotes "Heat pump", 12*c* "Tank temperature and IR sensors", 12*d* "Electric car charger/discharger", 12*e* "Electric Solar panels", 12*f* "Wind Power", and 12*g* denotes "Web control panel". Furthermore, 20*a* denotes "Electric lights", 20*b* "Freezer and Fridge", 20*c* "Consumption, production and storage etc.", 20*d* "Power meters", 20*e* "Home Battery bank (with charge inverter)", 20*f* "Fans", 20*g* "Home power accounting system", and 20*h* denotes "Security and Alarm system Water meter etc.".

FIG. 12*b* also shows other utilities (water meter and security 43/20*h*) using the same smart home bus. This gives the advantage that they can share many functions and communication channels. For instance to raise alarm in case of abnormal temperatures or water flows. The user access the home installation using a control panel, or more likely by using a computer with a web browser to access a built-in web server.

FIG. 13 illustrates an Intelligent Traffic System based on the invention where some of the systems are mobile, using a wireless radio communication system for the communication. The FIG. 13 illustrates an intelligent traffic management system that applies a toll fee depending on the current or expected congestion and/or pollution level, combined with traditional toll gates, and functions to optimize traffic flow. Vehicles can then have built-in units that calculates (or requests) least-toll or speed optimized routes. At the same time, central functions can get better data to anticipate congestions. The invention allows adding increasingly advanced functionality to legacy systems for e.g. toll road payments.

According to the method for creating a computer system arrangement in accordance with embodiments described above, the information model mapping between the individual application data models 7, the generic information model 6, and the information model 60 used in the organization is performed using an information modeling tool arranged to define and describe the models and how they shall interrelate to each other.

Figure 14:
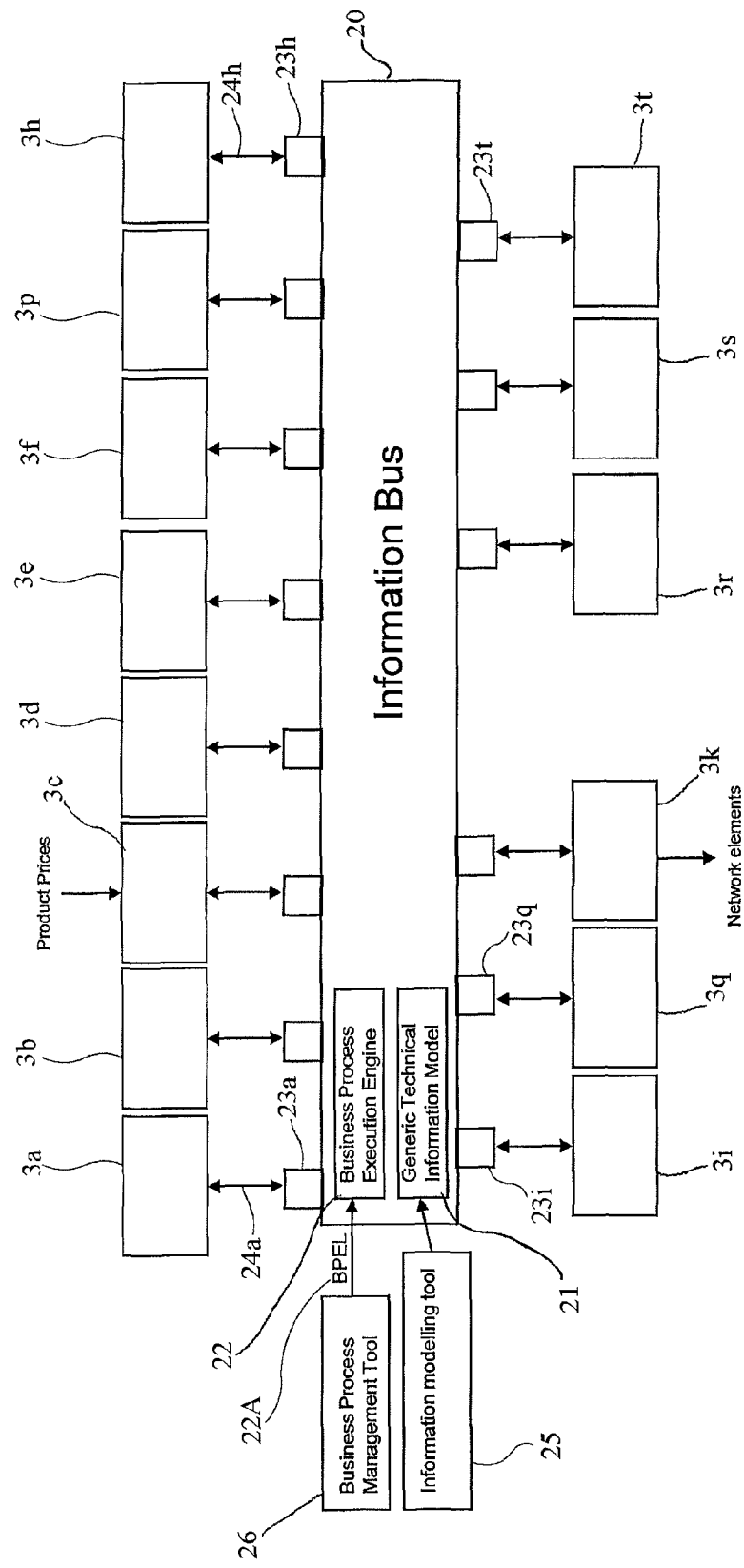
FIG. 14 shows an example of a system in accordance with the invention to describe steps that may be used to add a function/application to it.
Figure 15:
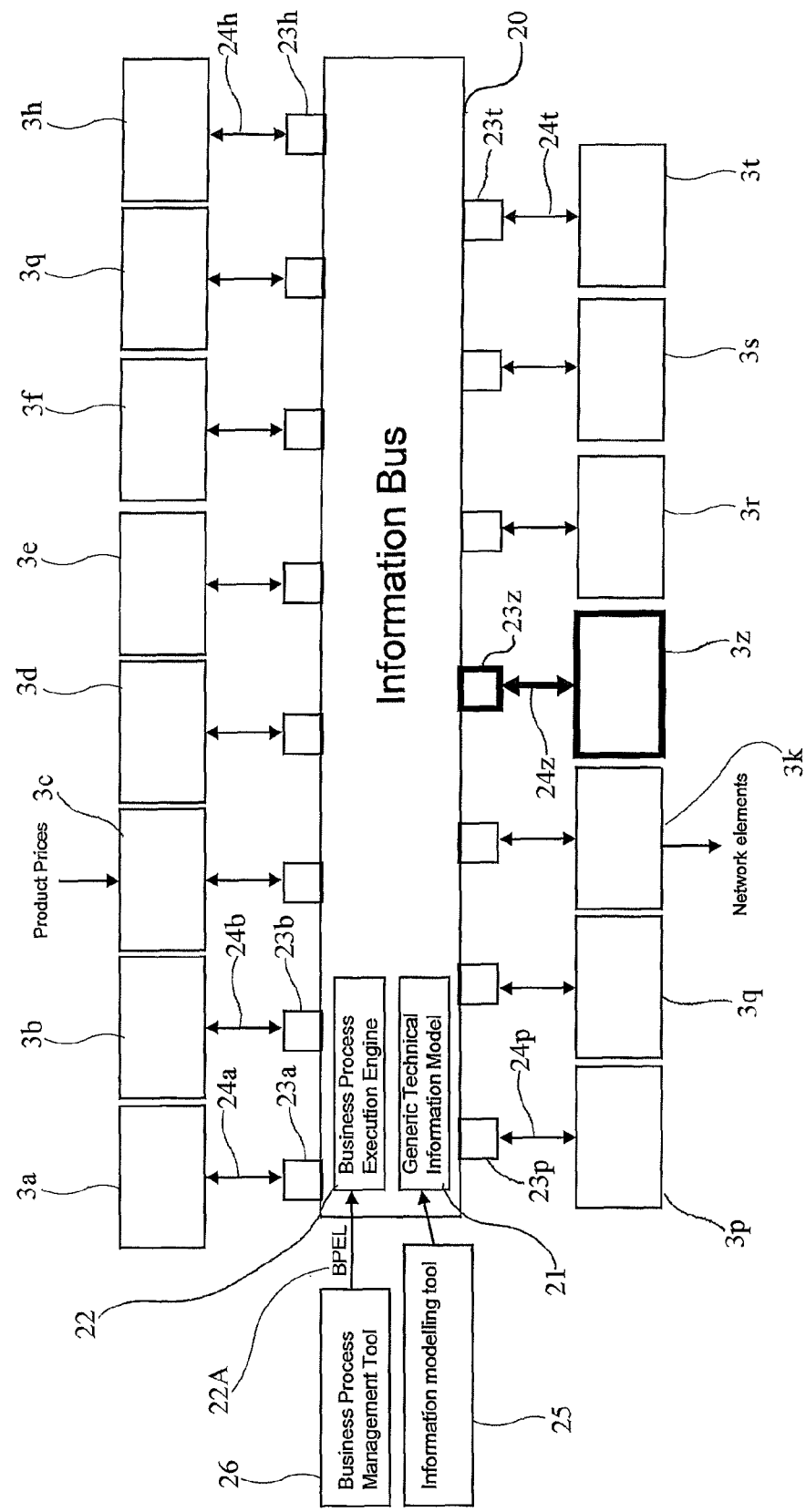
FIG. 15 shows the example of FIG. 14 after a new function/application has been added.

With reference to FIG. 14 there is presented an example of steps to add a function/application 3 to a computer system arrangement according to the invention, assuming the desire to add a credit check function to the system illustrated in FIG. 14 to end up with a system as presented in FIG. 15. The reason to add the credit check application 3*z* could be that the operator suffers from, or fear to suffer from, some customers placing orders for post-paid products without the ability to pay for them. A condition for accepting such orders shall thus be that the customer is considered credit-worthy. Such credit-checking shall be accessible from several places, like the webshop, customer care, reseller web etc.

The following steps may be used to add the desired function:

1. Identify a suitable way to estimate the credit-worthiness of a customer. In this example, assume that a third party company provides a credit check function/application 3*z* as a part of a credit-check system based on the customer's general credit history and other available information. An agreement is made with the company operating the credit check system which includes the agreed interface specification, e.g. as a Web Service.
2. Produce a physical connection and security specification (can be of any kind e.g. Web Service XML, api, structured file of any sort, etc).

3. Perform logical connection and information mapping i.e. data model mapping between the information structure in the credit check application 3 and the generic mode used in the GTiM 21 in the information Bus 20. This is then handled in the adapter 23z for the credit check. If the data model requires changes in the Generic Technical Information Model 21 in the Information Bus 20, this will be done in IMT 25 and then updated in the GTiM 21 in the Information Bus 20.
4. Use cases definition and process definition/modification. (The process involved are modified/created in the BPMT 26 and then updated in the BPEE 22 in the information Bus 20).
5. Fault handling definition and Quality Assurance specification. (The processes involved are modified/created in the BPMT 26 and then updated in the BPEE 22 in the information bus).
6. Testing, deployment and simulation. Testing is first made in a separate testing system, then deployment and simulation is performed in the production environment without disrupting the production.
7. When simulations are satisfactory, the modified process(es) that includes the credit check application 3z is activated by changing its status from simulation to production. The next next time the process is invoked, the credit check application will be performed without any interruption by calling the application 3z.
8. New use cases calling that new application 3z may be added later. For instance, if the credit check application 3z initially was only used for orders from the web shop 3b, also other systems, like the CRM system 3a, can also use the credit check function/application 3z for certain products simple by modifying processes, without making any changes in the bus-credit check interface adapter 23a.

The adapters 23a-o fulfill at least two purposes, viz., on one hand, to translate/map data (see FIG. 9), and on the other hand, to request the desired process/activity. Thereafter, the adapter translates in both directions the activity request and also provides for supplying the data that has been translated by means of the adapter.

Figure 16:
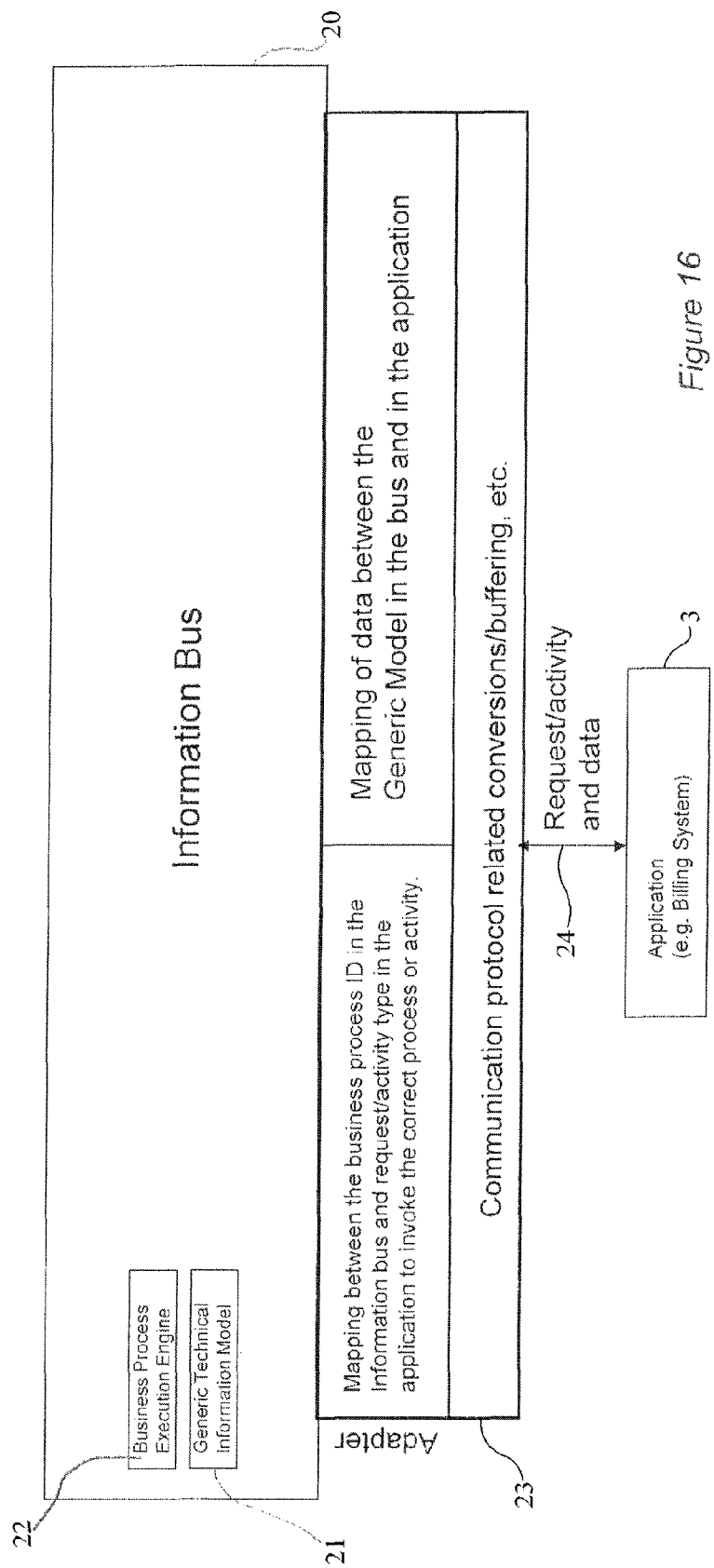
FIG. 16 shows a schematic detail view of an adapter in accordance with the invention.

FIG. 16 schematically shows the functioning of the adapters 24 connected between the subsystems/applications and the information bus 20. The mapping of data is performed within each adapter 23.

Modifications of the computer system arrangement according to the invention are of course possible within the scope of the claims. Furthermore, it is evident that the skilled person knows that a variety of different known components, both software and hardware and combinations thereof, may be used to achieve the functionality in accordance with the principles presented above. Moreover, it is foreseen that some of the functional aspects described above, as also some of the specific systems described above, may be the subject for their own patent applications, by means of filing of divisional applications.

The invention claimed is:

1. A computer system arrangement for minimizing communication and integration complexity between a plurality of software applications, wherein at least a subset of these applications has an individual data model each defining an individual set of application parameters,
   a. comprising a bus arrangement having connections to each one of said plurality of applications,
   b. wherein said bus is arranged to interpret between each application and to orchestrate incoming and outgoing requests from each application, said bus arrangement including:
   c. a generic information model defining a set of generic parameters in relation to the application parameters of each application,
   d. incoming and outgoing adaptor arranged to interconnect each connection with said generic information model,
   e. said adaptor together with said generic information model, in connection with an incoming request, arranged to map parameters of that individual data model to said generic parameters,
   f. said bus arrangement being arranged to translate and to data map information at said incoming and outgoing requests via said incoming and outgoing adaptor connected to said applications,
   g. wherein said bus is arranged to transfer said mapped generic information model together with the request to a process execution engine,
   h. said process execution engine is arranged to handle said request to identify a corresponding adaptor to which said request was directed, and
   i. using said corresponding adaptor together with said generic information model to remap said request to the individual data model of the application to which it is was directed.

2. The computer system arrangement according to claim 1, wherein said adaptor comprises a plurality of adaptor boxes connected in between each one of said connections and said bus arrangement.

3. The computer system arrangement according to claim 2, wherein each adaptor box further includes at least one communication protocol.

4. The computer system arrangement according to claim 1, wherein said transfer bus arrangement includes logic based on rules defined in a Business Process Execution Engine, arranged to initiate actions at certain triggering events or times.

5. The computer system arrangement according to claim 4, wherein said Business Process Execution Engine is programmed by a Business Process Management Language engine.

6. The computer system arrangement according to claim 5, wherein said programming is achieved by using a Business Process Management Tool.

7. The computer system arrangement according to claim 1, wherein said system further includes a product database and configurator arranged to form a central part in a coherent product definition with prices and configuration parameters for each product.

8. The computer system arrangement according to claim 7, wherein said coherent product definition is arranged to be used by other applications.

9. The computer system arrangement according to claim 8, wherein said other applications are at least billing and/or provisioning, etc. arranged to retrieve the relevant information relating to products when performing tasks such as calculating invoices, activating services, and/or presenting product offerings.

10. The computer system arrangement according to claim 1, wherein a plurality of said applications has individual information models.

11. The computer system arrangement according to claim 1, wherein the information model mapping between the individual application data models, the generic information model, and the information model used in the organization is performed using an information modeling tool arranged to define and describe the models and how they shall interrelate to each other.

12. The computer system arrangement according to claim 2, wherein said system further includes a product database and configurator arranged to form a central part in a coherent product definition with prices and configuration parameters for each product.

13. The computer system arrangement according to claim 3, wherein said system further includes a product database and configurator arranged to form a central part in a coherent product definition with prices and configuration parameters for each product.

14. The computer system arrangement according to claim 4, wherein said system further includes a product database and configurator arranged to form a central part in a coherent product definition with prices and configuration parameters for each product.

15. The computer system arrangement according to claim 5, wherein said system further includes a product database and configurator arranged to form a central part in a coherent product definition with prices and configuration parameters for each product.

16. The computer system arrangement according to claim 6, wherein said system further includes a product database and configurator arranged to form a central part in a coherent product definition with prices and configuration parameters for each product.

17. The computer system arrangement according to claim 2, wherein a plurality of said applications has individual information models.

18. The computer system arrangement according to claim 3, wherein a plurality of said applications has individual information models.

19. The computer system arrangement according to claim 4, wherein a plurality of said applications has individual information models.

20. The computer system arrangement according to claim 5, wherein a plurality of said applications has individual information models.

* * * * *